United States Patent
Maass et al.

(10) Patent No.: US 10,587,108 B2
(45) Date of Patent: *Mar. 10, 2020

(54) CABLE GLANDS

(71) Applicant: HUBBELL INCORPORATED, Shelton, CT (US)

(72) Inventors: William M. Maass, St. Louis, MO (US); Christopher J. Minski, St. Louis, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/346,648

(22) PCT Filed: Oct. 27, 2017

(86) PCT No.: PCT/US2017/058652
§ 371 (c)(1),
(2) Date: May 1, 2019

(87) PCT Pub. No.: WO2018/085135
PCT Pub. Date: May 11, 2018

(65) Prior Publication Data
US 2019/0288498 A1    Sep. 19, 2019

Related U.S. Application Data

(63) Continuation of application No. 15/343,624, filed on Nov. 4, 2016, now Pat. No. 10,008,845.

(51) Int. Cl.
H02G 3/18 (2006.01)
H02G 15/06 (2006.01)
H02G 15/013 (2006.01)
H02G 15/007 (2006.01)
(Continued)

(52) U.S. Cl.
CPC ............ *H02G 15/06* (2013.01); *H02G 3/0616* (2013.01); *H02G 3/22* (2013.01); *H02G 15/007* (2013.01); *H02G 15/013* (2013.01)

(58) Field of Classification Search
CPC .... H02G 15/06; H02G 15/007; H02G 15/013; H02G 3/22; H02G 3/24; H02G 3/26; H02G 3/36; H02G 15/00; H02G 15/02; H02G 15/04; H02G 15/064; H02G 15/20;
(Continued)

(56) References Cited

U.S. PATENT DOCUMENTS

RE38,294 E    11/2003  Nattel
6,809,263 B2  10/2004  Jackson
7,002,077 B2   2/2006  Pyron
(Continued)

OTHER PUBLICATIONS

PCT International Search Report and Written Opinion dated Nov. 22, 2017 in corresponding Application No. PCT/US17/58652, 6 pages.

*Primary Examiner* — Angel R Estrada
(74) *Attorney, Agent, or Firm* — Dilworth IP, LLC

(57) ABSTRACT

The present disclosure provides cable glands having an entry portion, an elbow portion and an exit portion. The entry portion includes an entry component. The elbow portion is physically coupled to the entry portion and includes a locking collar, a snap ring and a union elbow. The exit portion is physically coupled to the elbow portion and includes a middle nut, a rubber seal, a seal clamp and a back nut.

22 Claims, 17 Drawing Sheets

(51) Int. Cl.
*H02G 3/22* (2006.01)
*H02G 3/06* (2006.01)

(58) Field of Classification Search
CPC ......... H02G 15/24; F16C 1/107; H01B 17/58;
H01B 17/583; H01B 17/586
USPC ....... 174/668, 652, 650, 653, 654, 655, 660,
174/539, 554, 564, 667, 651; 277/312,
277/313, 314; 439/578, 320, 567;
285/322, 331, 390, 149.1, 154.1, 154.3,
285/154.4; 138/96 R, 96 T; 248/49, 68.1
See application file for complete search history.

(56) References Cited

U.S. PATENT DOCUMENTS

| | | | |
|---|---|---|---|
| 7,394,021 B2 | 6/2008 | Magno, Jr. | |
| 8,170,390 B2 | 5/2012 | Hand | |
| 8,692,139 B2 | 4/2014 | Aldrich et al. | |
| 8,919,221 B2 | 12/2014 | Chiou | |
| 10,008,845 B2 * | 6/2018 | Maass | H02G 3/0616 |
| 2015/0222107 A1 | 8/2015 | Jackson et al. | |

* cited by examiner

CABLE GLANDS

BACKGROUND

Field

The present disclosure relates generally to cable glands for protecting wiring therein, more specifically, cable gland elbows for more efficiently changing a direction of cable wiring between entry into and exit from the cable gland maintaining various protective features of the cable glands.

Description of the Related Art

A cable gland is a protective device for physically and electrically routing a cable, such as an electrical cable or optical fiber cable. The electrical cable may contain a number of electrically conductive elements, each typically including insulated copper wiring, to transmit power and/or electrical signals. The optical fiber cable may contain a number of optical fibers capable of carrying light in order to transmit optical signals. The cable gland is also sometimes known as a cable connector or cable fitting and may be constructed from metallic or non-metallic materials, depending on the intended application. Cable glands are used with many different types of electrical power, control, instrumentation, data and telecommunications cables. They are used as a sealing and termination device to ensure that the enclosure supporting the cable inside maintains an internal environment suitable for enabling a cable to perform its intended functions in a variety of different external environments. Some of these external environments can be very hazardous to the functioning and performance of the enclosed cable without the cable gland. For example, the types of hazardous environments cable glands are used in include fresh and salt water, temperature extremes, corrosive chemicals, and combustible or explosive materials.

In one common application, cable glands are used to seal cable entries to electrical junction boxes or other electrical equipment. In one type of known cable gland, the electrical conductors are embedded in a hardenable filler compound contained in a barrier sleeve located within the gland body. In another type of known cable gland, the electrical conductors pass through a diaphragm or compression seal supported to maintain engagement with the electrical conductors under a pressure differential across the seal. The known glands for these applications employ components designed for the intended application. These typically include components made of brass that are expensive to manufacture and there is a need for components that can be converted for different applications in a simple and cost effective manner.

The cables can be armored or non-armored. A cable gland provides strain-relief and connects by a means suitable for the type and description of cable for which it is designed—including provision for making electrical connection to the armor or braid and lead or aluminum sheath of the cable, if any. Cable glands may also be used for sealing cables passing through bulkheads or gland plates. Cable glands are mechanical cable entry devices and can be constructed from metallic or non-metallic materials. They are used throughout a number of industries in conjunction with cable and wiring used in electrical instrumentation and automation systems.

SUMMARY

In some embodiments, the present disclosure describes a cable gland including a union elbow having a bend as described herein. The cable glands enable cables disposed therein to bend and make connections in a more compact space than otherwise achieved.

In some other embodiments, the present disclosure describes a cable gland having physically coupled components including an entry component, a first O-ring, a potting chamber, a locking collar, a snap ring, a second O-ring, a union elbow, a third O-ring, an armor stop, a grounding spring, a middle nut, a rubber seal, a seal clamp and a back nut.

In some still other embodiments, the present disclosure described a cable gland having an entry portion, an elbow portion and an exit portion. The entry portion includes an entry component. The elbow portion is physically coupled to the entry portion and includes a locking collar, a snap ring and a union elbow. The exit portion is physically coupled to the elbow portion and includes a middle nut, a rubber seal, a seal clamp and a back nut.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description.

Reference in this specification to "one embodiment," "an embodiment" or the like means that a particular feature, structure, characteristic, advantage or benefit described in connection with the embodiment may be included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

The present disclosure provides cable glands having a union elbow with an angled or curved (bent) interior cavity to enable cables within the cable gland to change direction between entry and exit of the cable gland. In some embodiments the change in direction enables a reduction in an amount of space required for physically and electrically or optically coupling cables within the cable gland to components outside the cable gland. Through use of union elbows, as described herein, various cable glands are described that enable a cable contained within to be protected by the cable gland from environmental hazards while maintaining the integrity of the cable. In some embodiments, the cable glands provide strain relief, electrical grounding and/or environmental protection, including explosive environment protection. In some embodiments, environmental protection provided by one or more cable glands disclosed herein have features, in conformance with, or exceeding, various standards such as applicable National Electrical Code (NEC) standards.

While various embodiments describe union elbows enabling cable glands to maintain angled shapes at 90° and 45°, the invention is not limited to any particular angle, or set of angles, and numerous other angles are envisioned, such as 30°, 60°, etc. Unless described to the contrary, embodiments described herein are adapted for armored cables and are electrically grounded. While various embodiments of the cable gland may be described as being sealed, unsealed, electrically grounded, electrically ungrounded, armored and unarmored, the invention is not necessarily limited to any particular feature or combination of features.

Figure 1:
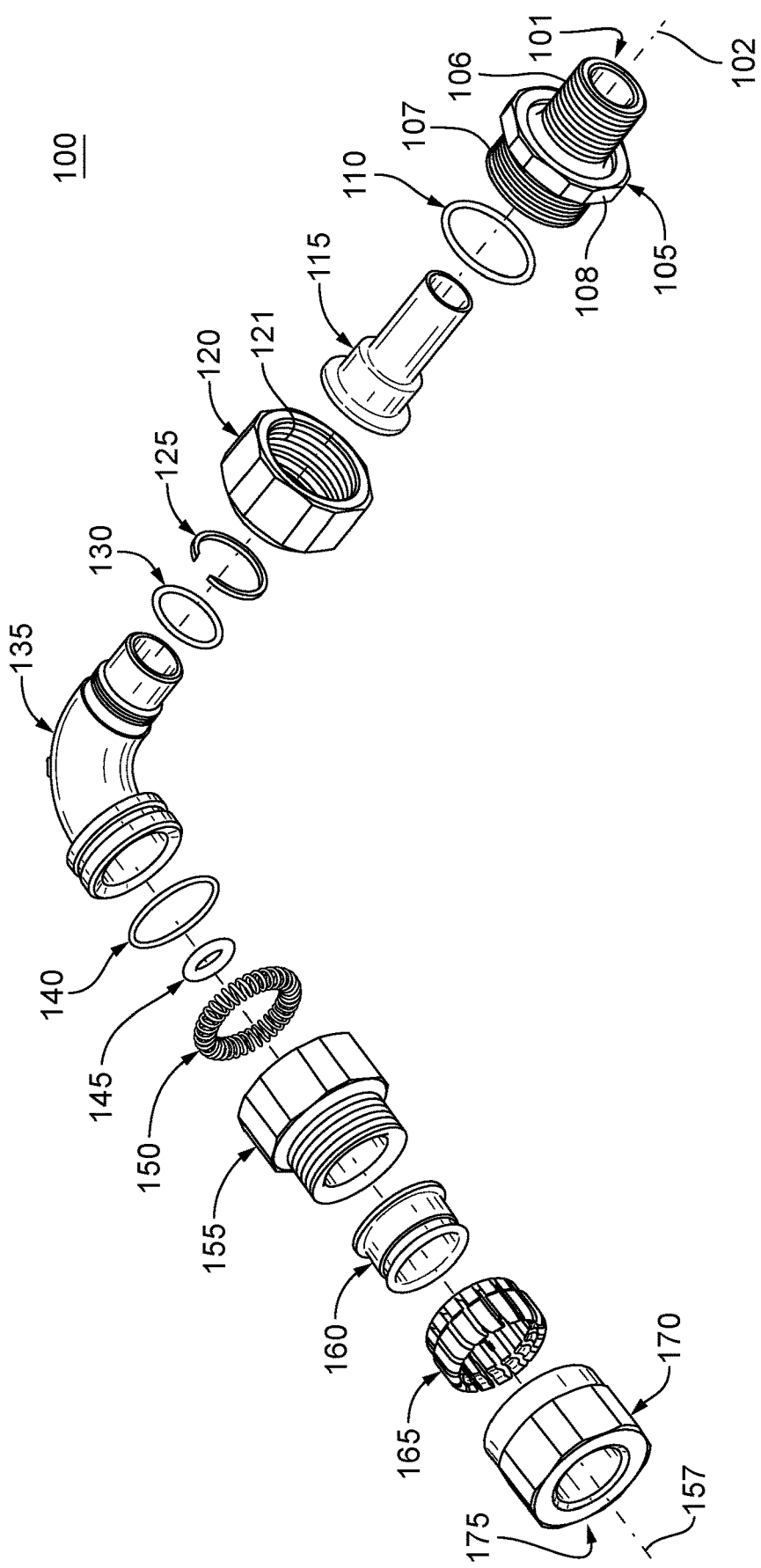
FIG. 1 is an exploded perspective view of an exemplary embodiment of a sealed, armored cable gland having a 90° bend angle according to the present disclosure.

Referring to FIG. 1, an exploded perspective view of an exemplary embodiment of a sealed, armored cable gland 100 having a 90° bend angle according to the present disclosure is shown. An entry component 105 is designed to receive a cable for enclosure through a cable entry aperture 101 along a first central axis 102 of the cable gland 100. Although the cable itself is described herein as entering the entry component through a cable entry aperture 101, in some embodiments the cable exits through the cable entry aperture, and the cable gland 100 is not limited to any particular entry/exit orientation. The entry component 105 includes a proximal threaded section 106 and a distal threaded section 107 separated by a multi-sided section 108 as shown in FIG. 1. The three sections 106-108 radially surround the first central axis 102 and the cable entry aperture 101 that passes completely through the entry component 105. In some embodiments, the proximal threaded section 106 of the entry component 105 has male National Pipe Thread Taper (NPT) threads for attachment to entry holes in electrical enclosures. However, in other embodiments, the proximal threaded section 106 has male NPT threads adapted to other structures. NPT is a known U.S. standard for tapered threads often used on threaded pipes and fittings. In contrast to straight threads that are often found on bolts, a taper thread will pull tight and therefore make a tighter seal such as a fluid-tight seal or an air-tight seal. Similarly, the distal threaded section 107 of the entry component 105 has male threads, however, in some embodiments, the distal threaded section 107 has a greater diameter than the proximal threaded section 106.

In some embodiments, the entry component 105 is made of corrosion-resistant steel, however, the entry components may be made of other materials compatible with the intended environment, including plastic and other metals and alloys, such as aluminium. Similarly, various components of cable gland 100 are not limited to being corrosion-resistant steel and may be formed from a variety of materials.

A first O-ring 110 is physically coupled to the entry component 105. The first O-ring 110 is made of an elastomeric material, such as rubber, but may be made of any suitable material for the intended environment, including materials other than rubber. The first O-ring 110 functions to seal the joint between the entry component 105 and a locking collar 120. A potting chamber 115 provides a compartment for making a seal between an enclosed cable and the cable gland 100. The potting chamber 115 is adapted to contain a potting compound to help seal and protect an enclosed cable passing through the potting chamber. In some embodiments, the potting compound is a two component epoxy putty that holds the enclosed cable in place, and further protects the enclosed cable from a harsh external environment, such as an explosive environment. In some embodiments, the potting compound is a two-component material injected into the potting chamber. In some embodiments, the potting compound enhances the hazardous environment resistance, including explosive environment resistance, of the cable gland 100.

The potting chamber 115 is physically coupled to the entry component 105 and the locking collar 120. A proximal threaded portion 121 of the locking collar 120 has female threads adapted to physically couple with the male threads of the distal threaded portion 107 of the entry component 105. The locking collar 120 is adapted to tighten to the distal threaded portion 107 of the entry component 105 and contain both the first O-ring 110 and potting chamber 115 inside the mated locking collar and entry component.

The locking collar 120 is physically coupled with a snap ring 125 and a second O-ring 130 to a union elbow 135. In some embodiments, the locking collar 120 includes a groove to retain the snap ring 125. The groove allows the locking collar 120 to rotate freely while still being held axially in place by the snap ring 125. Prior to physically coupling the locking collar 120 with the entry component 105 by tightening, the cable gland 100 can be rotated to any desired position such that its cable entry aperture 101 in the entry component and a cable exit aperture 175 (described herein) match those of the intended connections for the enclosed cable. Because the cable gland 100 has a 90° bend in it, the locking collar 120 advantageously provides 360° rotational flexibility to position the bend as needed prior to tightening. This freedom of rotation enables the union elbow 135 to be installed without the need to rotate it in advance to ensure proper alignment. In some embodiments, the locking thread collar 120 is machined metal.

Similar to the locking collar 120, the union elbow 135 also contains a groove in an entry end proximally located to the locking collar, as opposed to an exit end that is distally located to the locking collar, for physically coupling with the snap ring 125 and the second O-ring 130. Note that identification of various entry ends and exit ends in components identified herein are intended to describe orientation and proximity, with entry ends being closer to an entry end in the entry component 105 and exit ends being further from the entry end in the entry component, and not be limiting with regard to installation of an enclosed cable. In some embodiments, the snap ring 125 is a coiled metal and is retained by the grooves in the locking collar 120 and the union elbow 135. Because there are grooves in both the locking collar 120 and the union elbow 135, the snap ring 125 is not intended to be easily removed or permit easy disassembly of the union elbow and locking collar. In some embodiments, the snap ring 125 prevents disassembly of the locking collar 120 and the union elbow 135.

On its exit end, the union elbow 135 also contains grooves for a third O-ring 140, an armor stop 145, and a grounding spring 150, to help secure the union elbow's connection to a middle nut 155. In some embodiments, the second O-ring 130 and the third O-ring 140 are installed into grooves in the union elbow 135 prior to physical coupling with the locking collar 120 and the middle nut 155, respectively. In some embodiments, the second O-ring 130 is installed into a groove in the union elbow 135 prior to attaching the locking collar 120 to seal a joint between union elbow and the locking collar. In some embodiments, the third O-ring 140 is installed into a groove in the union elbow 135 prior to attaching the middle nut 155 to seal a joint between the union elbow and the middle nut. In this fashion, the second O-ring 130 and the third O-ring 140 help enable the cable gland 100 to achieve a particular hazardous environmental rating for the cable gland.

In some embodiments, the union elbow 135 is cast metal machined to have male threads adjacent its exit end to physically couple to corresponding female threads in an entry end of the middle nut 155. In some embodiments, the union elbow 135 includes a tapered surface adjacent to its exit end adapted to help compress the grounding spring 150 inside the middle nut 155. In some embodiments, the entry end of the union elbow 135 is positioned around the first central axis 102 of the cable gland 100 and the exit end of the union elbow is positioned around a second central axis 157 of the cable gland 100. A deflection (bend angle) between the first central axis 102 and the second central axis 157 describes the angle the union elbow 135 is bent. In some embodiments, the bend angle is a continuous bend around a circle of a fixed radius between 3 inches to 6 inches, in other embodiments, the bend angle is a continuous bend around a circle of a fixed radius between 9 inches to 12 inches. Although specific examples of continuous bends around particular radius circles are described, the cable gland is not limited to any particular continuous bend radius or even a fixed radius. In some embodiments, an aperture passing through the union elbow 135 is at each point within the union elbow above a predefined minimum diameter, in order to enable a cable to be more reliably passed through the union elbow.

In some embodiments, the middle nut 155 is adapted to enclose the grounding spring 150, the armor stop 145 and the third O-ring 140 when physically coupled to the union elbow 135. In some embodiments, the grounding spring 150 is adapted to form an electrically conductive contact with an enclosed cable having conductive metal armor to create electrical continuity between the enclosed cable and the cable gland 100 for electrical grounding purposes.

An exit end of the middle nut 155 is adapted to be physically coupled to a rubber seal 160, a seal clamp 165 and a back nut 170. In some embodiments, the seal clamp 165 is bright orange in color. In some embodiments, the back nut 170 is red in color to indicate the cable gland 100 is designed to contain a potting compound, as described herein, to seal in and protect an enclosed cable in a hazardous environment including fresh water, salt water, temperature extremes, corrosive chemicals, and/or combustible or explosive materials. Alternatively, in some embodiments, the back nut 170 is gray in appearance to indicate the cable gland 100 is unsealed and is not designed with a potting chamber 115 or a potting compound. Note that while the back nut 170 is described herein as being either red or gray, the cable gland 100 in general, and the back nut 170 in particular, are not limited to any particular set of color or grayscale combinations. The rubber seal 160 works in combination with the seal clamp 165 and the back nut 170 to clamp onto an outer jacket of an enclosed cable for strain relief and environmental protection. In some embodiments, the rubber seal 160 is formed from an elastomeric compound. Note that component identifying terms used herein such as "rubber seal" are intended to describe some embodiments and are not intended to be limiting. For example, the rubber seal 160 may be formed of any compatible elastomeric material. The back nut 170 includes a cable exit aperture 175 distal to the union elbow 135.

In some embodiments, the cable gland 100 includes three separate portions for easier identification, each portion including some of the components described above. In some embodiments, an entry portion includes the entry component 105, the first O-ring 110 and the potting chamber 115. In some embodiments, an elbow portion includes the locking collar 120, the snap ring 125, the second O-ring 130, the union elbow 135 and the third O-ring 140. In some embodiments, an exit portion includes the armor stop 145, the grounding spring 150, the middle nut 155, the rubber seal 160, the seal clamp 165 and the back nut 170. In some embodiments, the entry portion and the exit portion have components corresponding to those in a MCX Series 90°

Cable Gland, such as MCX19C, manufactured by Killark, a division of Hubbell Incorporated, 40 Waterview Drive, Shelton, Conn. 06484-1000.

Figure 2:
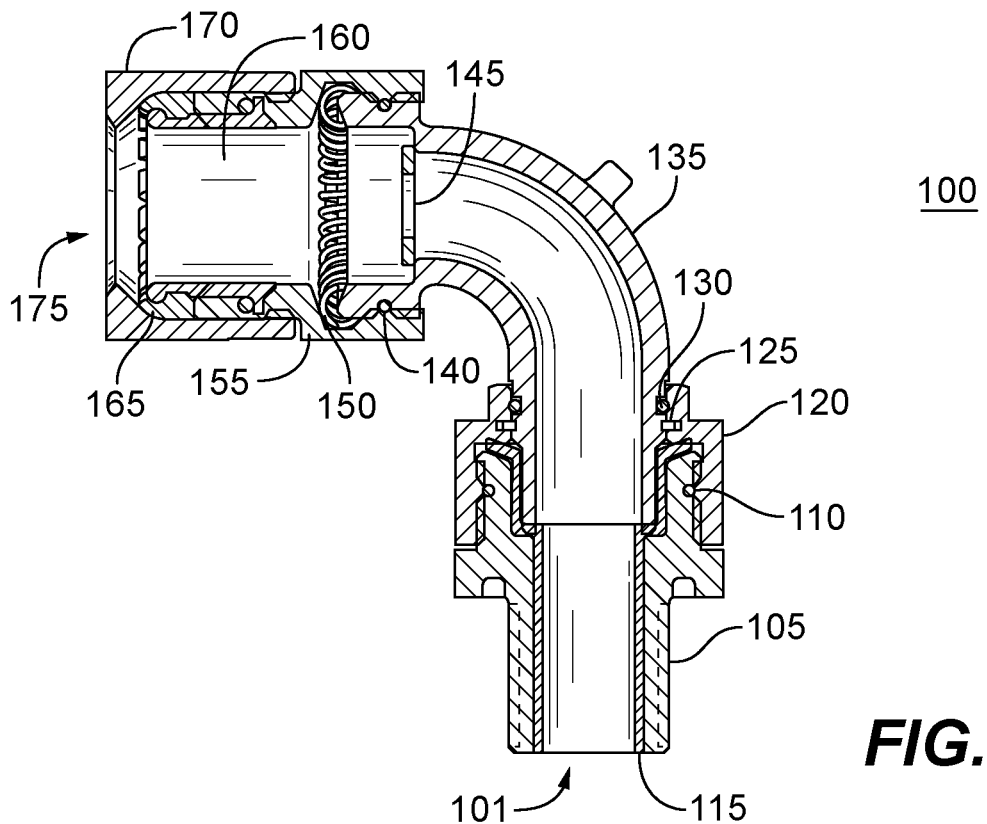
FIG. 2 is a cross-sectional side view of the cable gland of FIG. 1 according to the present disclosure.

Referring to FIG. 2, a cross-sectional side view of the cable gland 100 of FIG. 1 according to the present disclosure is shown. The first O-ring 110 is physically coupled between the entry component 105 and the locking collar 120. The potting chamber 115 is physically coupled to the entry component 105 and the locking collar 120 at a different location than that of the first O-ring 110, as shown in FIG. 2. In some embodiments, the snap ring 125 resides in a groove in the union elbow 135, leaving a small air gap between an outer periphery of the snap ring and the locking collar 120. In some embodiments, the snap ring 125 extends into a corresponding groove in the locking collar 120 containing the small air gap to enable the union elbow 135 to rotate while preventing the locking collar from being removed from physical coupling with the union elbow. The second O-ring 130 is also physically coupled between the locking collar 120 and the union elbow 135 at a location adjacent to, but different from, that of the snap ring 125, as shown in FIG. 2.

The third O-ring 140 is physically coupled between the union elbow 135 and the middle nut 155. The armor stop 145 is positioned inside the union elbow 135 as shown in FIG. 2. In some embodiments, the armor stop 145 is held in place in the union elbow 135 by a cable armor end physically coupled with armor stop. The cable armor end holds the armor stop 145 against an inner surface (groove) of the union elbow 135. In this fashion, the armor stop 145 prevents (stops) the cable armor end from passing further into the union elbow 135. In some embodiments, the armor stop includes a center aperture for allowing one or more electrical or optical cable components to pass through the center aperture, while preventing cable armor to pass through because the center aperture is too small to allow cable armor to pass. In some embodiments, the armor stop 145 is omitted because cable conductors or cable optical fibers in a large enclosed cable are too wide to pass through the armor stop. In that situation, the inner surface of the union elbow 135 acts as an armor stop to prevent the further passage of cable armor of the large enclosed cable. The grounding spring 150 is positioned between, compressed by, and physically coupled to the union elbow 135 and the middle nut 155. The rubber seal 160 is positioned between and physically coupled to the middle nut 155 and the seal clamp 165. The back nut 170 is positioned radially around and physically coupled to the seal clamp 165. The entry component 105 is designed to receive a cable for enclosure through the cable entry aperture 101 of the cable gland 100. The back nut 170 is designed to transmit an enclosed cable out through the cable exit aperture 175 of the cable gland 100. However, in some embodiments, the entry component 105 is designed to transmit a cable out through the cable entry aperture 101 of the cable gland 100, and the back nut 170 is designed to receive the cable through the exit aperture 175.

Figure 3:
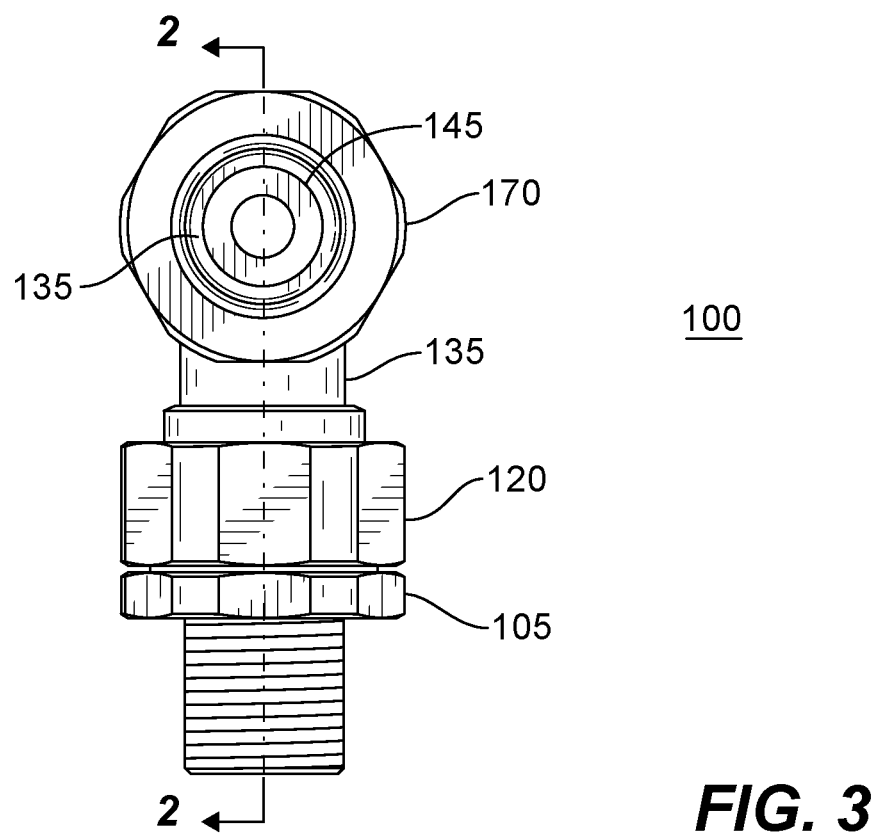
FIG. 3 is a front plan view of the cable gland of FIG. 1 according to the present disclosure.

Referring to FIG. 3, a front plan view of the cable gland 100 of FIG. 1 according to the present disclosure is shown. For reference, FIG. 2 is a cross-sectional side view taken along a plane of line 2-2. In FIG. 3, the entry component 105 is physically coupled to the locking collar 120. The union elbow 135 is physically coupled to the locking collar 120 above the locking collar as shown in FIG. 2. The back nut 170 is physically coupled to the union elbow 135 above the locking collar as shown in FIG. 2. and includes the cable exit aperture 175 distal to the union elbow. The armor stop 145 is contained within the union elbow 135 and is shown resting against the inner surface of the union elbow 135.

Because the cable gland 100 is shown physically coupled together in FIG. 3, the first O-ring 110, the potting chamber 115, the snap ring 125, the second O-ring 130, the third O-ring 140, the grounding spring 150, the rubber seal 160 and the seal clamp 165 are contained within the cable gland and have surfaces not externally visible.

Figure 4:
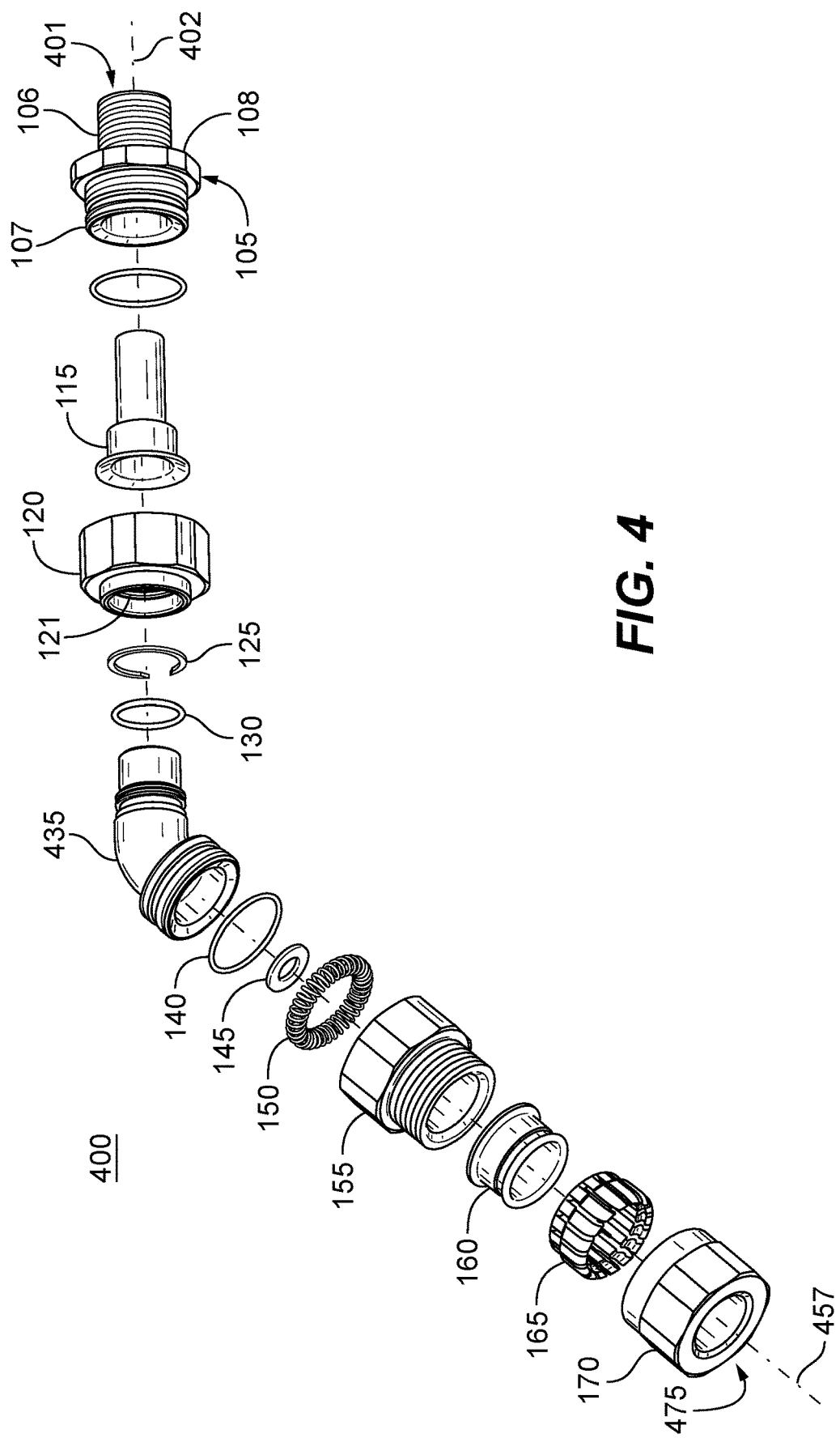
FIG. 4 is an exploded perspective view of an exemplary embodiment of a sealed, armored cable gland having a 45° bend angle according to the present disclosure.

Referring to FIG. 4, an exploded perspective view of an exemplary embodiment of a sealed, armored cable gland 400 having a 45° bend angle according to the present disclosure is shown. Note that as described herein, components with identical reference numbers in different figures, such as those shown in FIGS. 1-3, are intended to describe the same component. For example, entry component 105 in FIG. 1 is also illustrated here in FIG. 4 as entry component 105. However, the inventory of components identified in FIGS. 1-3 are not identical to those illustrated here in FIG. 4. More specifically, a union elbow 435 in FIG. 4 takes the place occupied by the union elbow 135 in FIG. 1. In some embodiments, union elbow 435 has a 45° bend in it, but the invention is not limited to any particular angle, or set of angles, and numerous other angles are envisioned, such as 30°, 60°, etc.

In FIG. 4, the entry component 105 is designed to receive a cable for enclosure through a cable entry aperture 401 along a first central axis 402 of the cable gland 400. Although the cable itself is described herein as entering the entry component through a cable entry aperture 401, in some embodiments the cable exits through the cable entry aperture, and the cable gland 400 is not limited to any particular entry/exit orientation. The entry component 105 includes the proximal threaded section 106 and the distal threaded section 107 separated by the multi-sided section 108 as shown in FIG. 4. The three sections 106-108 radially surround the first central axis 402 and the cable entry aperture 401 that passes completely through the entry component 105. In some embodiments, the proximal threaded section 106 of the entry component 105 has male NPT threads for attachment to entry holes in electrical enclosures. However, in other embodiments, the proximal threaded section 106 has male NPT threads adapted to other structures. Similarly, the distal threaded section 107 of the entry component 105 has male threads, however, in some embodiments, the distal threaded section 107 has a greater diameter than the proximal threaded section 106.

In some embodiments, the entry component 105 is made of corrosion-resistant steel, however, the entry components may be made of other materials compatible with the intended environment, including plastic and other metals and alloys, such as aluminium. Similarly, various components of cable gland 400 are not limited to being corrosion-resistant steel and may be formed from a variety of materials.

The first O-ring 110 is physically coupled to the entry component 105. The first O-ring 110 is made of an elastomeric material, such as rubber, but may be made of any suitable material for the intended environment. The first O-ring 110 functions to seal the joint between the entry component 105 and The locking collar 120. The potting chamber 115 provides a compartment for making a seal between an enclosed cable and the cable gland 400. The potting chamber 115 is adapted to contain a potting compound to help seal and protect an enclosed cable passing through the potting chamber. In some embodiments, the potting compound is a two component epoxy putty that holds the enclosed cable in place, and further protects the enclosed cable from a harsh external environment, such as an explosive environment. In some embodiments, the potting compound is a two-component material injected into the potting chamber. In some embodiments, the potting compound enhances the hazardous environment resistance, including the hazardous environment resistance, of the cable gland 400.

The potting chamber 115 is physically coupled to the entry component 105 and the locking collar 120. The proximal threaded portion 121 of the locking collar 120 has female threads adapted to physically couple with the male threads of the distal threaded portion 107 of the entry component 105. The locking collar 120 is adapted to tighten to the distal threaded portion 107 of the entry component 105 and contain both the first O-ring 110 and potting chamber 115 inside the mated locking collar and entry component.

The locking collar 120 is physically coupled with the snap ring 125 and the second O-ring 130 to a union elbow 435. In some embodiments, the locking collar 120 includes a groove to retain the snap ring 125. The groove allows the locking collar 120 to rotate freely while still being held axially in place by the snap ring 125. Prior to physically coupling the locking collar 120 with the entry component 105 by tightening, the cable gland 400 can be rotated to any desired position such that its cable entry aperture 401 in the entry component and a cable exit aperture 475 (described herein) match those of the intended connections for the enclosed cable. Because the cable gland 400 has a 45° bend in it, the locking collar 120 advantageously provides 360° rotational flexibility to position the bend as needed prior to tightening. This freedom of rotation enables the union elbow 435 to be installed without the need to rotate it in advance to ensure proper alignment. In some embodiments, the locking thread collar 120 is machined metal.

Similar to the locking collar 120, the union elbow 435 also contains a groove in an entry end proximally located to the locking collar, as opposed to an exit end that is distally located to the locking collar, for physically coupling with the snap ring 125 and the second O-ring 130. Note that identification of various entry ends and exit ends in components identified herein are intended to describe orientation and proximity, with entry ends being closer to an entry end in the entry component 105 and exit ends being further from the entry end in the entry component, and not be limiting with regard to installation of an enclosed cable. In some embodiments, the snap ring 125 is a coiled metal and is retained by the grooves in the locking collar 120 and the union elbow 435. Because there are grooves in both the locking collar 120 and the union elbow 435, the snap ring 125 is not intended to be easily removed or permit easy disassembly of the union elbow and locking collar. In some embodiments, the snap ring 125 prevents disassembly of the locking collar 120 and the union elbow 435.

On its exit end, the union elbow 435 also contains grooves for the third O-ring 140, the armor stop 145, and the grounding spring 150, to help secure the union elbow's connection to the middle nut 155. In some embodiments, the second O-ring 130 and the third O-ring 140 are installed into grooves in the union elbow 435 prior to physical coupling with the locking collar 120 and the middle nut 155, respectively. In some embodiments, the second O-ring 130 is installed into a groove in the union elbow 435 prior to attaching the locking collar 120 to seal a joint between union elbow and the locking collar. In some embodiments, the third O-ring 140 is installed into a groove in the union elbow 435 prior to attaching the middle nut 155 to seal a joint between the union elbow and the middle nut. In this fashion, the second O-ring 130 and the third O-ring 140 help enable the cable gland 400 to achieve a particular hazardous environmental rating for the cable gland.

In some embodiments, the union elbow 435 is cast metal machined to have male threads adjacent its exit end to physically couple to corresponding female threads in an entry end of the middle nut 155. In some embodiments, the union elbow 435 includes a tapered surface adjacent to its exit end adapted to help compress the grounding spring 150 inside the middle nut 155. In some embodiments, the entry end of the union elbow 435 is positioned around the first central axis 402 of the cable gland 400 and the exit end of the union elbow is positioned around a second central axis 457 of the cable gland 400. A deflection (bend angle) between the first central axis 402 and the second central axis 457 describes the angle the union elbow 435 is bent. In some embodiments, the bend angle is a continuous bend around a circle of a fixed radius between 3 inches to 6 inches, in other embodiments, the bend angle is a continuous bend around a circle of a fixed radius between 9 inches to 12 inches. Although specific examples of continuous bends around particular radius circles are described, the cable gland is not limited to any particular continuous bend radius or even a fixed radius. In some embodiments, an aperture passing through the union elbow 435 is at each point within the union elbow above a predefined minimum diameter, in order to enable a cable to be more reliably passed through the union elbow.

In some embodiments, the middle nut 155 is adapted to enclose the grounding spring 150, the armor stop 145 and the third O-ring 140 when physically coupled to the union elbow 435. In some embodiments, the grounding spring 150 is adapted to form an electrically conductive contact with an enclosed cable having conductive metal armor to create electrical continuity between the enclosed cable and the cable gland 400 for electrical grounding purposes.

An exit end of the middle nut 155 is adapted to be physically coupled to the rubber seal 160, the seal clamp 165 and the back nut 170. In some embodiments, the seal clamp 165 is bright orange in color. In some embodiments, the back nut 170 is red in color to indicate the cable gland 400 is designed to contain a potting compound, as described herein, to seal in and protect an enclosed cable in a hazardous environment including fresh water, salt water, temperature extremes, corrosive chemicals, and/or combustible or explosive materials. Alternatively, in some embodiments, the back nut 170 is gray in appearance to indicate the cable gland 400 is unsealed and is not designed with a potting chamber 115 or a potting compound. Note that while the back nut 170 is described herein as being either red or gray, the cable gland 400 in general, and the back nut 170 in particular, are not limited to any particular set of color or grayscale combinations. The rubber seal 160 works in combination with the seal clamp 165 and the back nut 170 to clamp onto an outer jacket of an enclosed cable for strain relief and environmental protection. In some embodiments, the rubber seal 160 is formed from an elastomeric compound. Note that component identifying terms used herein such as "rubber seal" are intended to describe some embodiments and are not intended to be limiting. For example, the rubber seal 160 may be formed of any compatible elastomeric material. The back nut 170 includes a cable exit aperture 475 distal to the union elbow 435.

In some embodiments, the cable gland 400 includes three separate portions for easier identification, each portion including some of the components described above. In some embodiments, an entry portion includes the entry component 105, the first O-ring 110 and the potting chamber 115. In some embodiments, an elbow portion includes the locking collar 120, the snap ring 125, the second O-ring 130, the union elbow 435 and the third O-ring 140. In some embodiments, an exit portion includes the armor stop 145, the grounding spring 150, the middle nut 155, the rubber seal 160, the seal clamp 165 and the back nut 170. In some embodiments, the entry portion and the exit portion have components corresponding to those in a MCX Series 45° Cable Gland, such as MCX14C, manufactured by Killark, a division of Hubbell Incorporated, 40 Waterview Drive, Shelton, Conn. 06484-4000.

Figure 5:
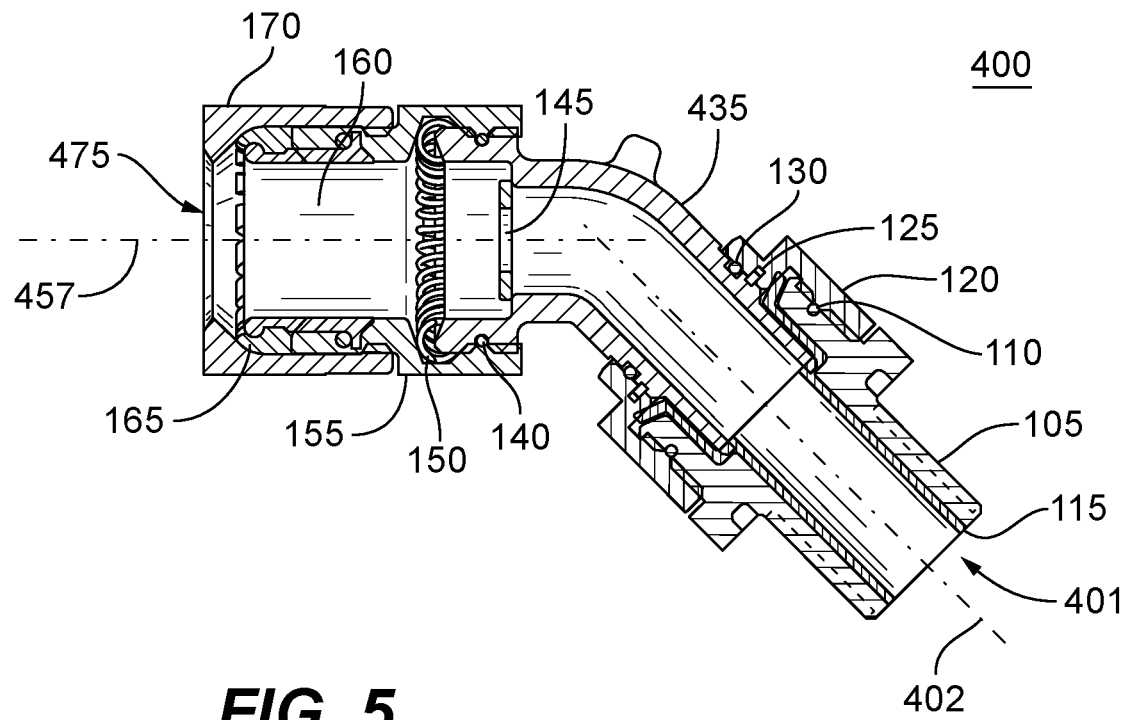
FIG. 5 is a cross-sectional side view of the cable gland of FIG. 4 according to the present disclosure.

Referring to FIG. 5, a cross-sectional side view of the cable gland 400 of FIG. 4 according to the present disclosure is shown. The first O-ring 110 is physically coupled between the entry component 105 and the locking collar 120. The potting chamber 115 is physically coupled to the entry component 105 and the locking collar 120 at a different location than that of the first O-ring 110, as shown in FIG. 5. In some embodiments, the snap ring 125 resides in a groove in the union elbow 435, leaving a small air gap between an outer periphery of the snap ring and the locking collar 120. In some embodiments, the snap ring 125 extends into a corresponding groove in the locking collar 120 containing the small air gap to enable the union elbow 435 to rotate while preventing the locking collar from being removed from physical coupling with the union elbow. The second O-ring 130 is also physically coupled between the locking collar 120 and the union elbow 435 at a location adjacent to, but different from, that of the snap ring 125, as shown in FIG. 5.

The third O-ring 140 is physically coupled between the union elbow 435 and the middle nut 155. The armor stop 145 is positioned inside the union elbow 435 as shown in FIG. 5. In some embodiments, the armor stop 145 is held in place in the union elbow 435 by a cable armor end physically coupled with armor stop. The cable armor end holds the armor stop 145 against an inner surface (groove) of the union elbow 435. In this fashion, the armor stop 145 prevents (stops) the cable armor end from passing further into the union elbow 435. In some embodiments, the armor stop 145 is omitted because cable conductors or cable optical fibers in a large enclosed cable are too wide to pass through the armor stop. In that situation, the inner surface of the union elbow 435 acts as an armor stop to prevent the further passage of cable armor of the large enclosed cable. The grounding spring 150 is positioned between, compressed by, and physically coupled to the union elbow 435 and the middle nut 155. The rubber seal 160 is positioned between and physically coupled to the middle nut 155 and the seal clamp 165. The back nut 170 is positioned radially around and physically coupled to the seal clamp 165. The entry component 105 is designed to receive a cable for enclosure through the cable entry aperture 401 of the cable gland 400. The back nut 170 is designed to transmit an enclosed cable out through the cable exit aperture 475 of the cable gland 400. However, in some embodiments, the entry component 105 is designed to transmit a cable out through the cable entry aperture 401 of the cable gland 400, and the back nut 170 is designed to receive the cable through the exit aperture 475.

Figure 6:
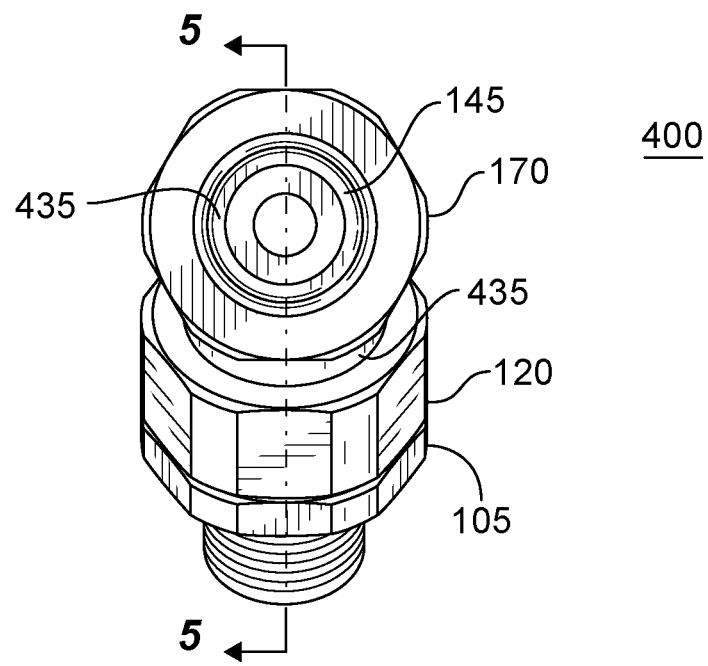
FIG. 6 is a front plan view of the cable gland of FIG. 4 according to the present disclosure.

Referring to FIG. 6, a front plan view of the cable gland 400 of FIG. 4 according to the present disclosure is shown. For reference, FIG. 5 is a cross-sectional side view taken along a plane of line 5-5 in FIG. 6. In FIG. 6, the entry component 105 is physically coupled to the locking collar 120. The union elbow 435 is physically coupled to the locking collar 120 above the locking collar as shown in FIG. 5. The back nut 170 is physically coupled to the union elbow 435 above the locking collar as shown in FIG. 5. and includes the cable exit aperture 475 distal to the union elbow. The armor stop 145 is contained within the union elbow 435 and is shown resting against the inner surface of the union elbow 435.

Because the cable gland 400 is shown physically coupled together in FIG. 6, the first O-ring 110, the potting chamber 115, the snap ring 125, the second O-ring 130, the third O-ring 140, the grounding spring 150, the rubber seal 160 and the seal clamp 165 are contained within the cable gland and have surfaces not externally visible.

Figure 7:
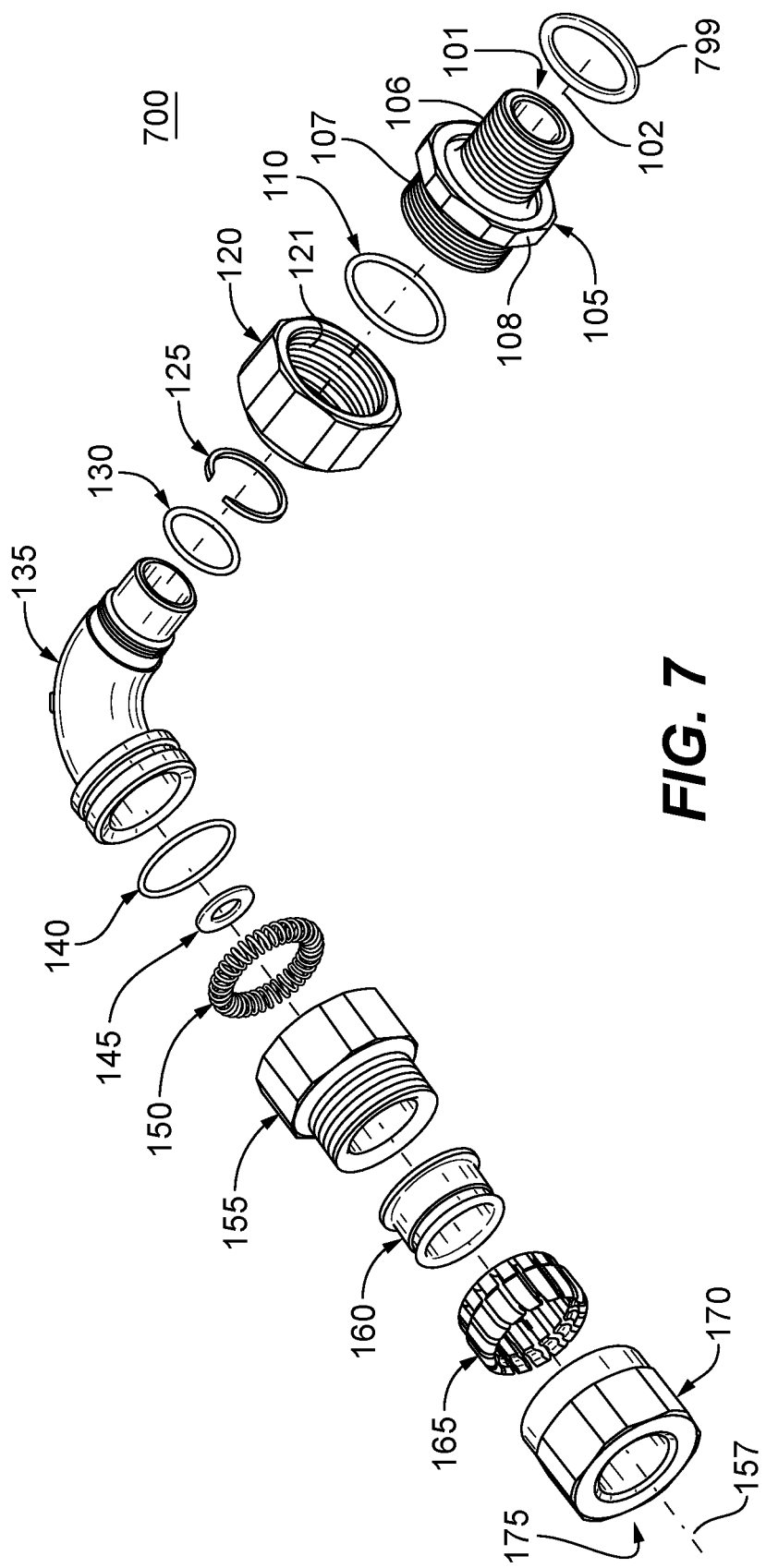
FIG. 7 is an exploded perspective view of an exemplary embodiment of an unsealed, armored cable gland having a 90° bend angle according to the present disclosure.
Figure 8:
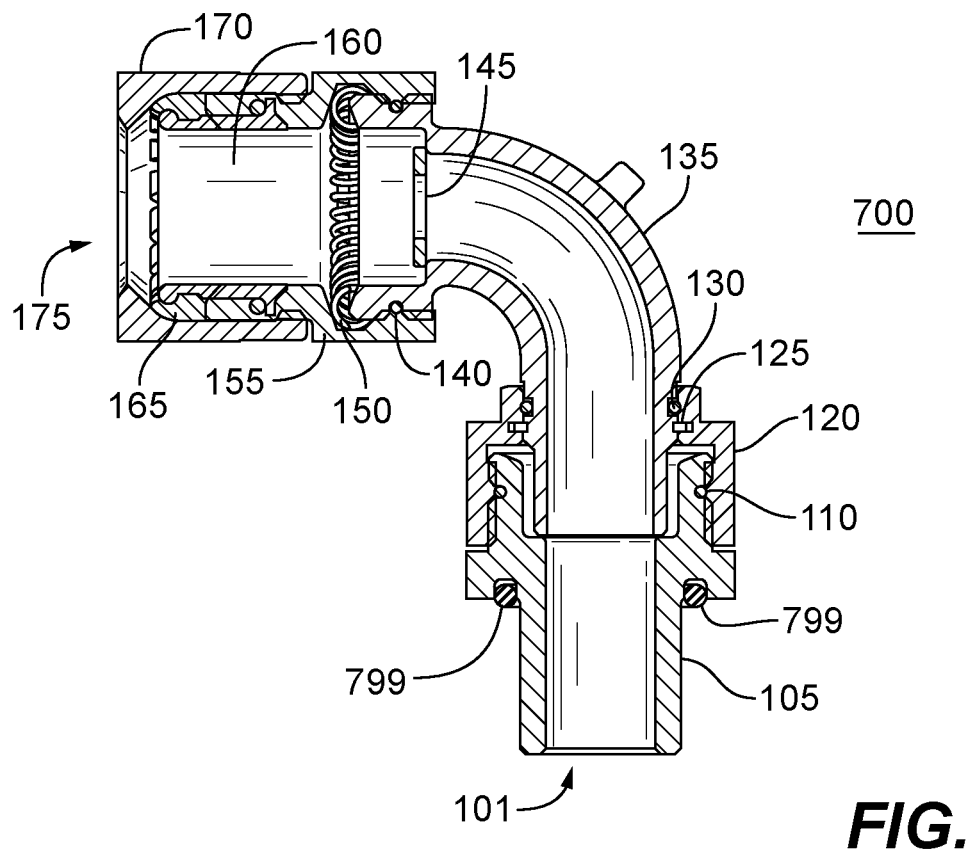
FIG. 8 is a cross-sectional side view of the cable gland of FIG. 7 according to the present disclosure.
Figure 9:
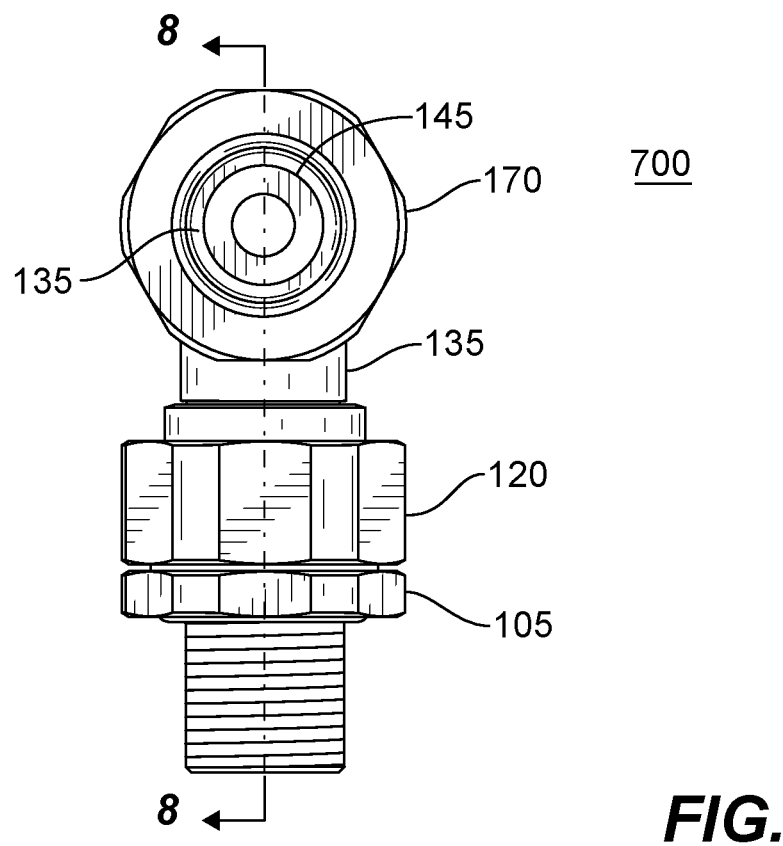
FIG. 9 is a front plan view of the cable gland of FIG. 7 according to the present disclosure.

Referring to FIG. 7, an exploded perspective view of an exemplary embodiment of an unsealed, armored cable gland 700 having a 90° bend angle according to the present disclosure is shown. Note that as described herein, components with identical reference numbers in different figures, such as those shown in FIGS. 1-3, are intended to describe the same component. For example, entry component 105 in FIG. 1 is also illustrated here in FIG. 7 as entry component 105. However, the inventory of components identified in FIGS. 1-3 are not identical to those illustrated here in FIG. 7. More specifically, the potting chamber 115 of FIG. 1 is not part of the embodiment illustrated in FIG. 7, thus cable gland 700 is not a sealed cable. In some embodiments, a separate O-ring 799 creates a seal between the entry component 105 and any surface, such as sheet metal, or enclosure, being physically coupled to. FIG. 8 is a cross-sectional side view of the cable gland of FIG. 7 according to the present disclosure is shown. FIG. 9 is a front plan view of the cable gland of FIG. 7 according to the present disclosure is shown. For reference, FIG. 8 is a cross-sectional side view taken along a plane of line 8-8 in FIG. 9.

Figure 10:
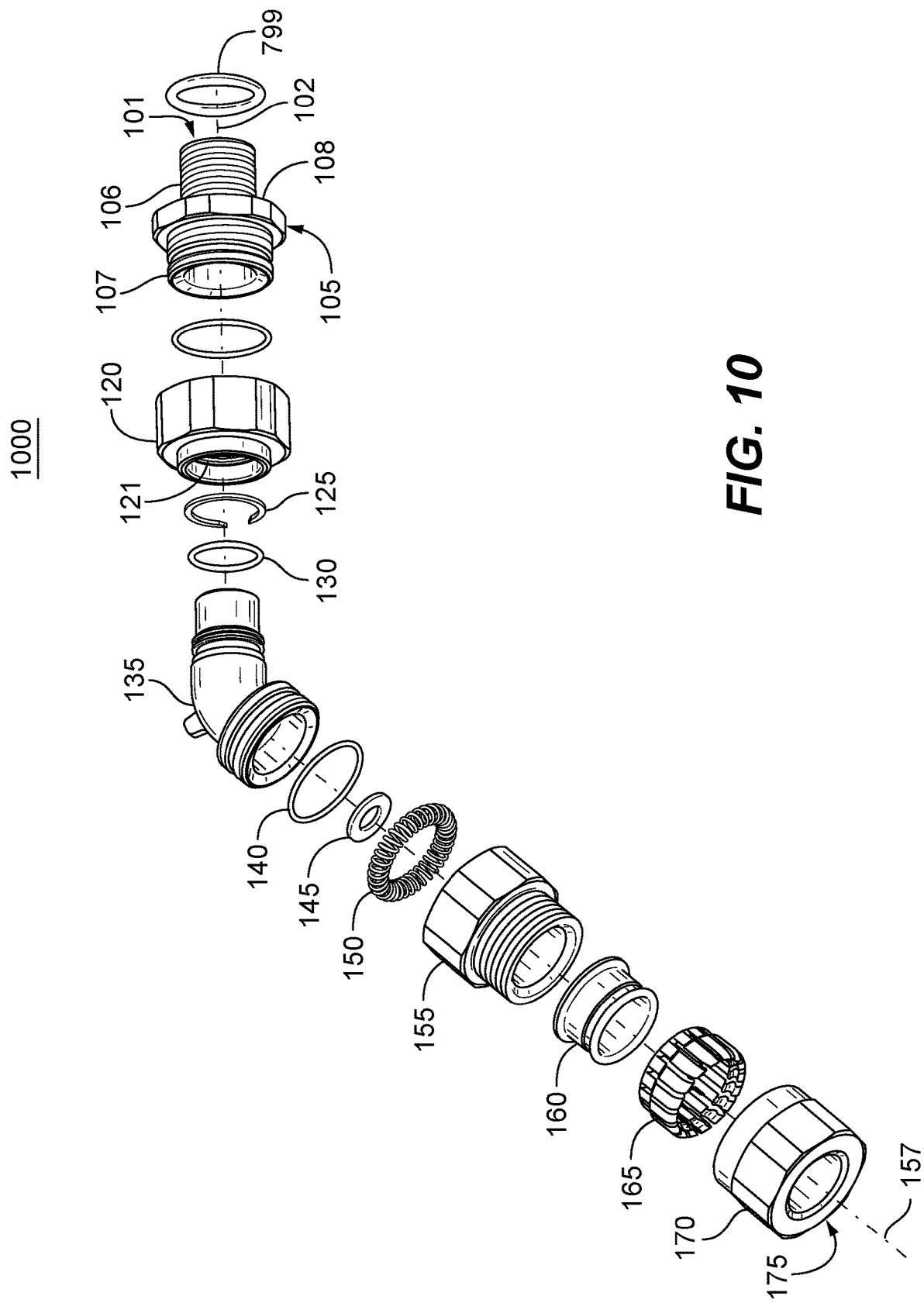
FIG. 10 is an exploded perspective view of an exemplary embodiment of an unsealed, armored cable gland having a 45° bend angle according to the present disclosure.
Figure 11:
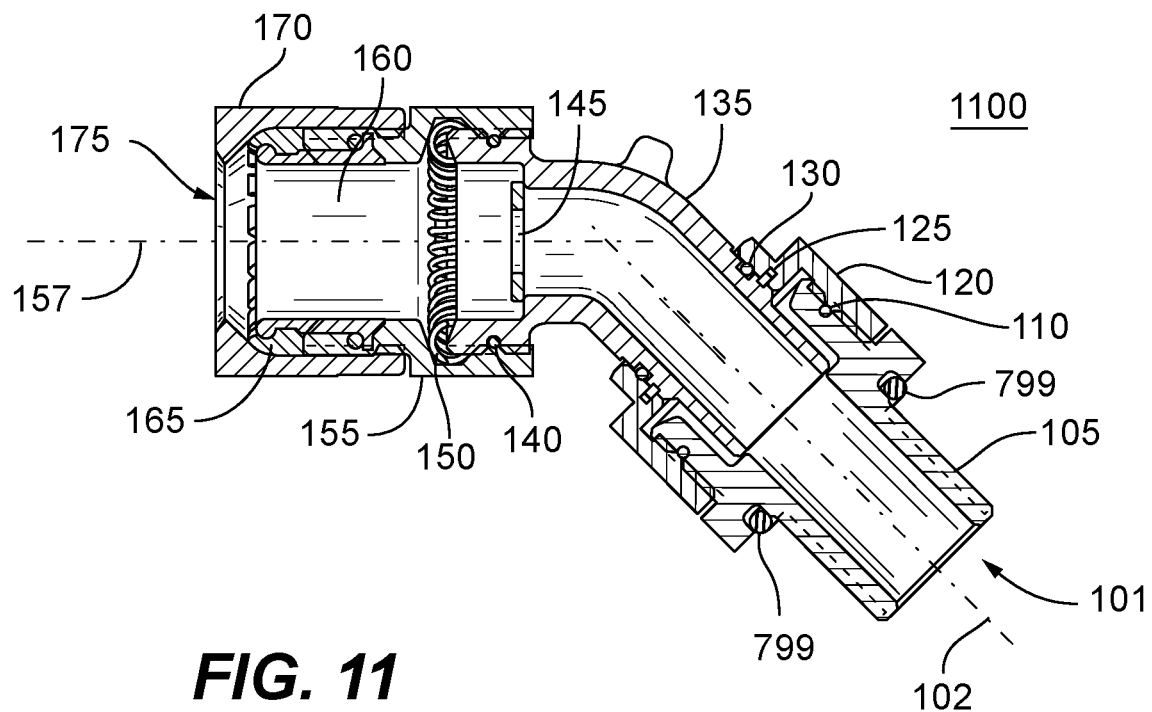
FIG. 11 is a cross-sectional side view of the cable gland of FIG. 10 according to the present disclosure.
Figure 12:
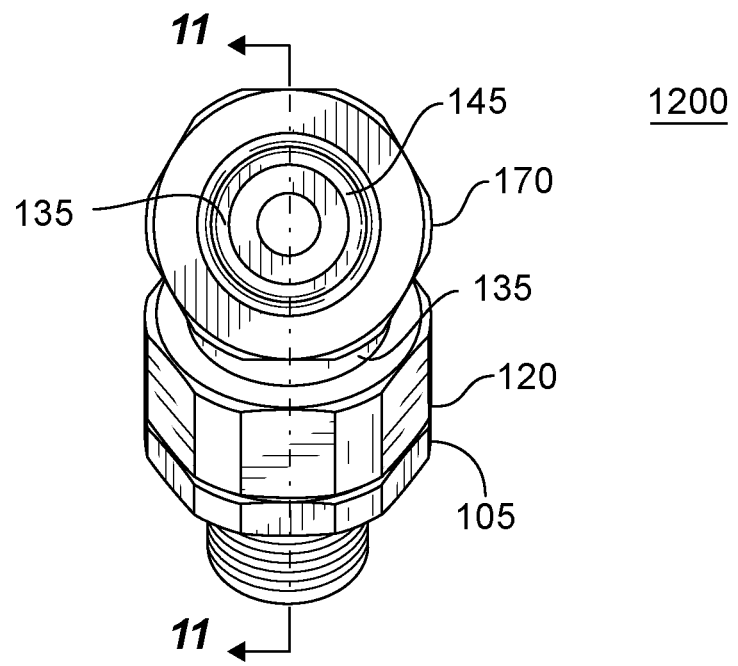
FIG. 12 is a front plan view of the cable gland of FIG. 10 according to the present disclosure.

Referring to FIG. 10, an exploded perspective view of an exemplary embodiment of an unsealed, armored cable gland 1000 having a 45° bend angle according to the present disclosure is shown. Note that as described herein, components with identical reference numbers in different figures, such as those shown in FIGS. 4-6, are intended to describe the same component. For example, entry component 105 in FIG. 4 is also illustrated here in FIG. 10 as entry component 105. However, the inventory of components identified in FIGS. 1-3 are not identical to those illustrated here in FIG. 10. More specifically, the potting chamber 115 of FIG. 4 is not part of the embodiment illustrated in FIG. 10, thus cable gland 1000 is not a sealed cable. In some embodiments, the separate O-ring 799 creates a seal between the entry component 105 and any surface, such as sheet metal, or enclosure, being physically coupled to. FIG. 11 is a cross-sectional side view of the cable gland of FIG. 10 according to the present disclosure is shown. FIG. 12 is a front plan view of the cable gland of FIG. 10 according to the present disclosure is shown. For reference, FIG. 11 is a cross-sectional side view taken along a plane of line 11-11 in FIG. 12.

Figure 13:
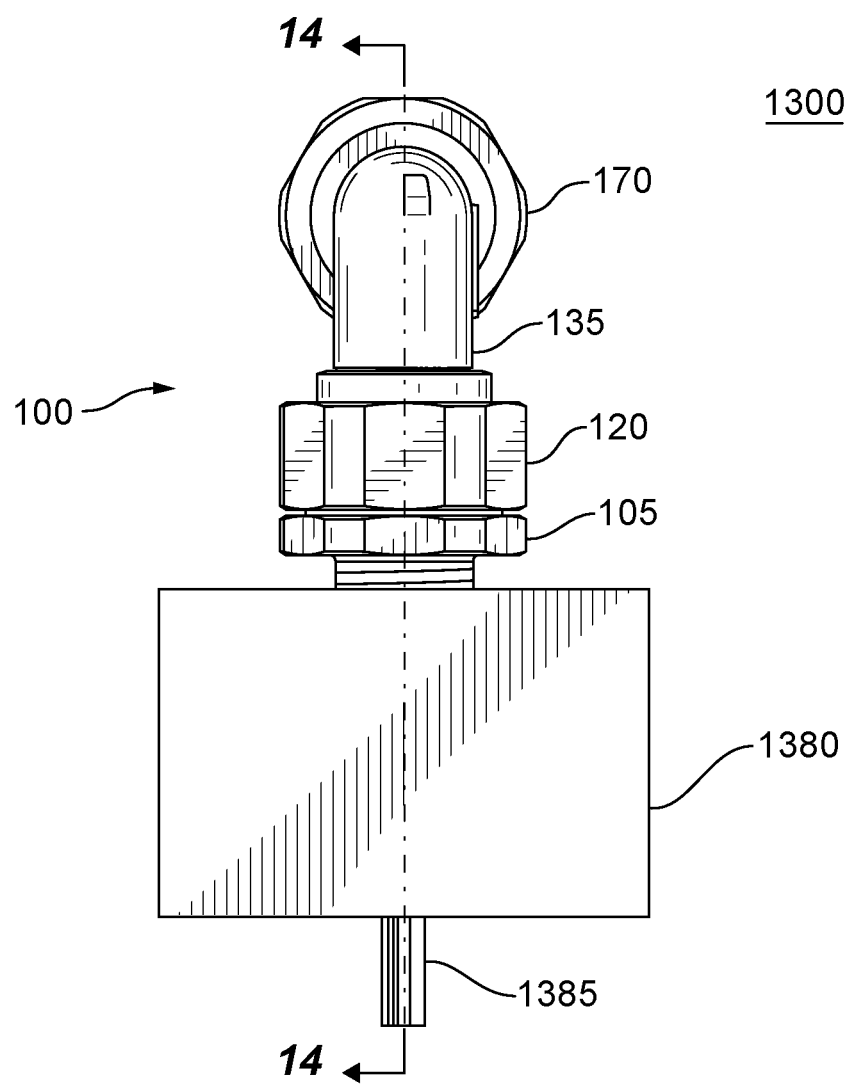
FIG. 13 is a back plan view of the cable gland of FIG. 1 installed in a cross-sectioned National Pipe Thread Taper (NPT)-compatible housing according to the present disclosure.

Referring to FIG. 13, a back plan view of the cable gland 1300 of FIG. 10 according to the present disclosure is shown. The cable gland 1300 is installed in a NPT-compatible housing 1380. In some embodiments, the housing 1380 is an electrical junction box, such as the electrical junction box shown in FIG. 24. A cable 1385 is physically coupled within the cable gland 1300. In some embodiments, the cable 1385 is a multi-conductor electrical cable, that is electrically coupled to the cable gland 1300. The cable 1385 is electrically grounded through the grounding spring 150.

In some embodiments, the potting chamber 115 contains a two-part epoxy and the cable 1385 to seal the cable 1385 against environmental hazards, including explosive environments, as described herein.

Figure 14:
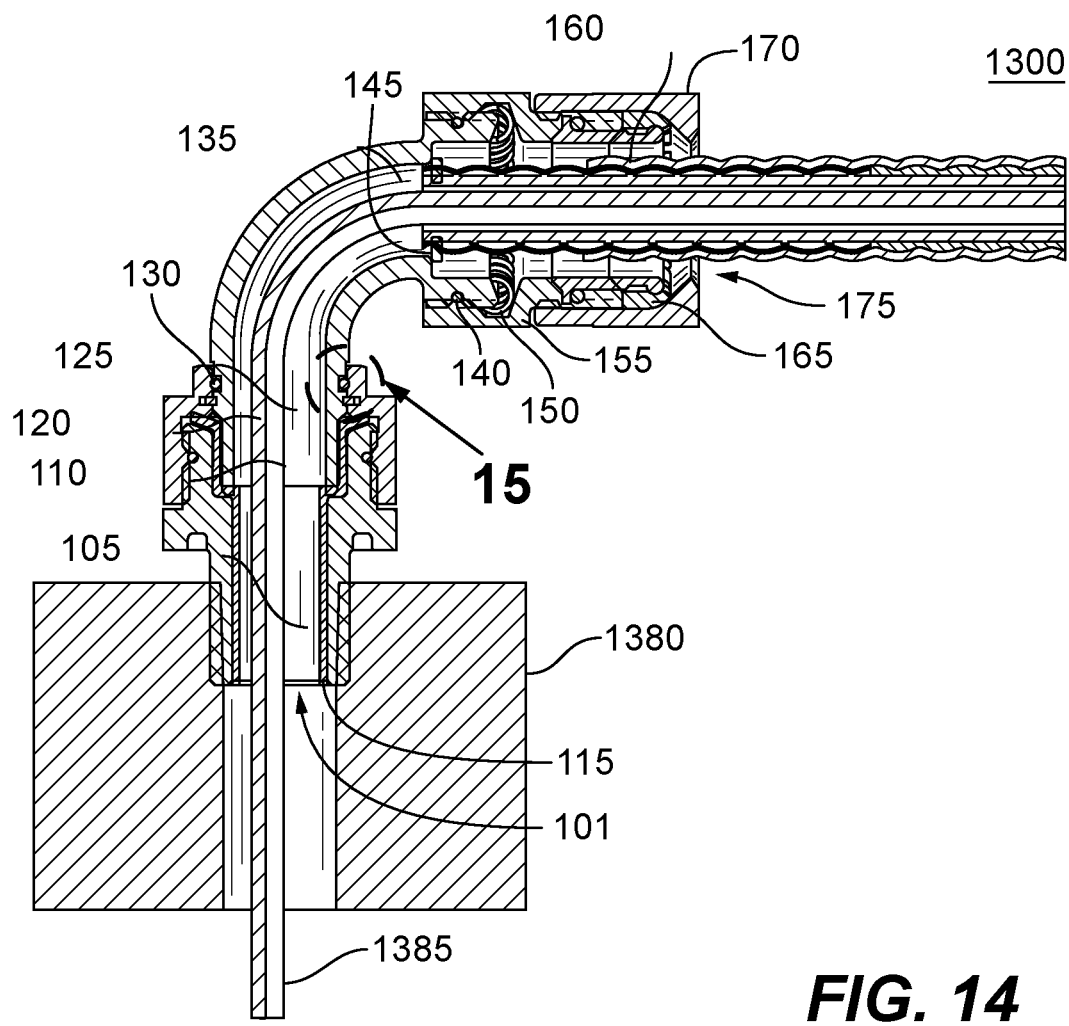
FIG. 14 is a sectional, cross-section side view of the cable gland of FIG. 13 according to the present disclosure.

Referring to FIG. 14, a sectional, cross-section side view of the cable gland of FIG. 13 according to the present disclosure is shown. For reference, FIG. 14 is a sectional, cross-section side view taken along a plane of line 14-14 in FIG. 13. The cable gland 1300 is installed in the NPT-compatible housing 1380. In some embodiments, the housing 1380 is an electrical junction box, such as the electrical junction box shown in FIG. 24. The cable 1385 is physically coupled within the cable gland 1300. In some embodiments, the cable 1385 is a multi-conductor electrical cable, that is electrically coupled to the cable gland 1300. The cable 1385 is electrically grounded through the grounding spring 150. In some embodiments, the potting chamber 115 contains a two-part epoxy and the cable 1385 to seal the cable 1385 against environmental hazards, including explosive environments, as described herein.

Figure 15:
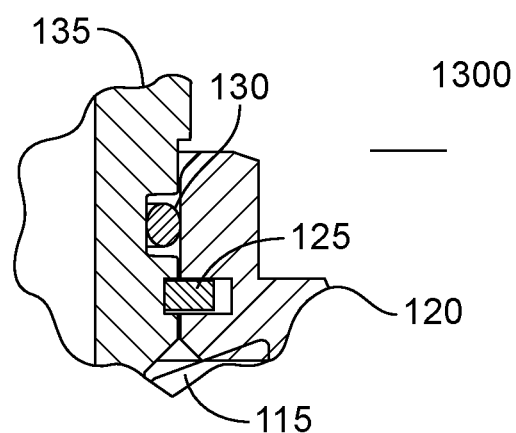
FIG. 15 is an expanded sectional view of a portion of the cable gland of FIG. 13 according to the present disclosure.

Referring to FIG. 15 is an expanded sectional view of a portion of the cable gland 1300 of FIG. 13 according to the present disclosure is shown. The potting chamber 115 is physically coupled to the entry component 105 (not shown here) and the locking collar 120. The locking collar 120 is physically coupled with the snap ring 125 and the second O-ring 130 to the union elbow 135. In some embodiments, the locking collar 120 includes a groove to retain the snap ring 125. The groove allows the locking collar 120 to rotate freely while still being held axially in place by the snap ring 125. Prior to physically coupling the locking collar 120 with the entry component 105 by tightening, the cable gland 100 can be rotated to any desired position such that its cable entry aperture 101 in the entry component and a cable exit aperture 175 (described herein) match those of the intended connections for the enclosed cable. Because the cable gland 100 has a 90° bend in it, the locking collar 120 advantageously provides 360° rotational flexibility to position the bend as needed prior to tightening. This freedom of rotation enables the union elbow 135 to be installed without the need to rotate it in advance to ensure proper alignment. In some embodiments, the locking thread collar 120 is machined metal.

Figure 16:
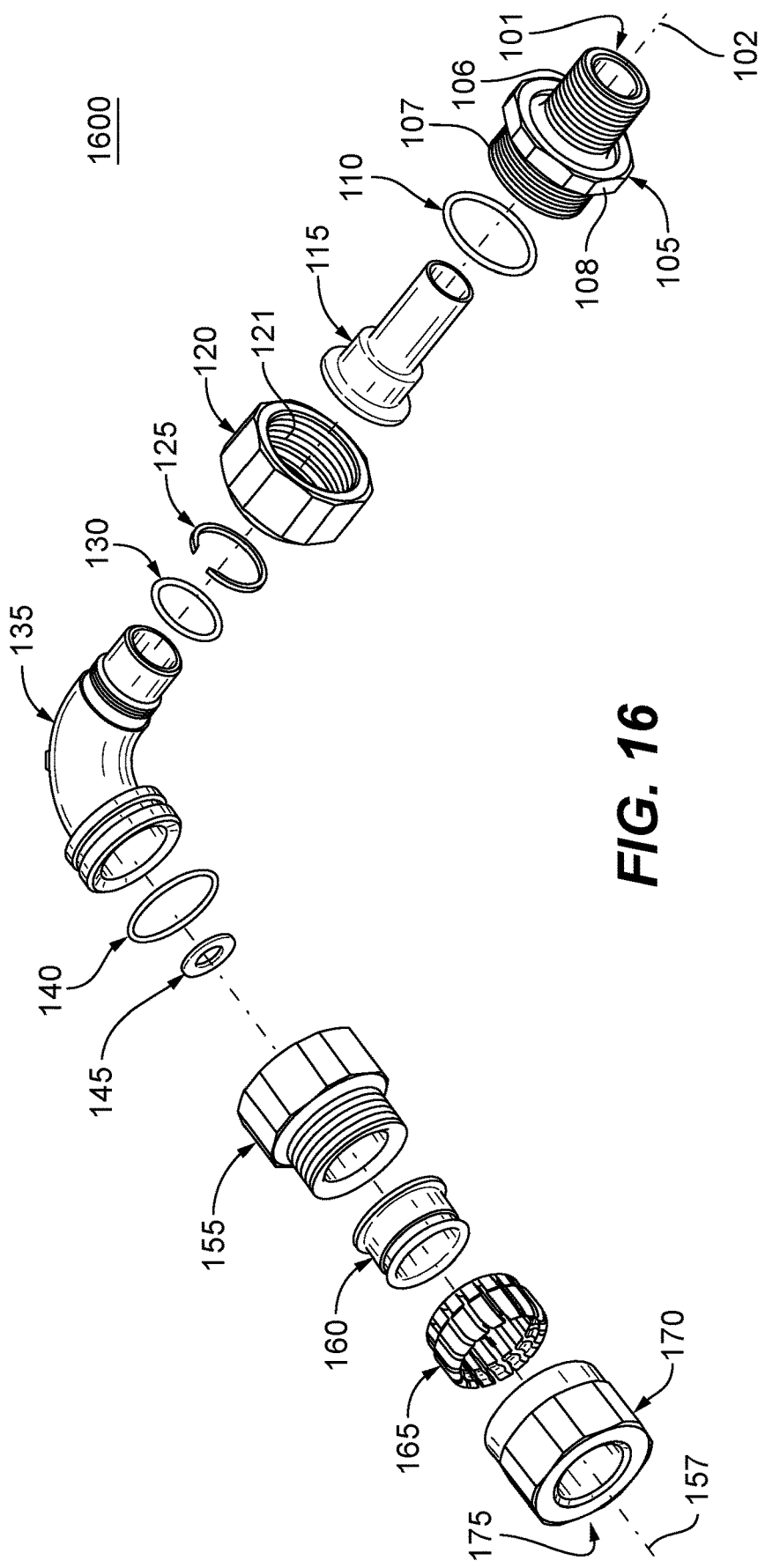
FIG. 16 is an exploded perspective view of an exemplary embodiment of a sealed, unarmored cable gland having a 90° bend angle according to the present disclosure.
Figure 17:
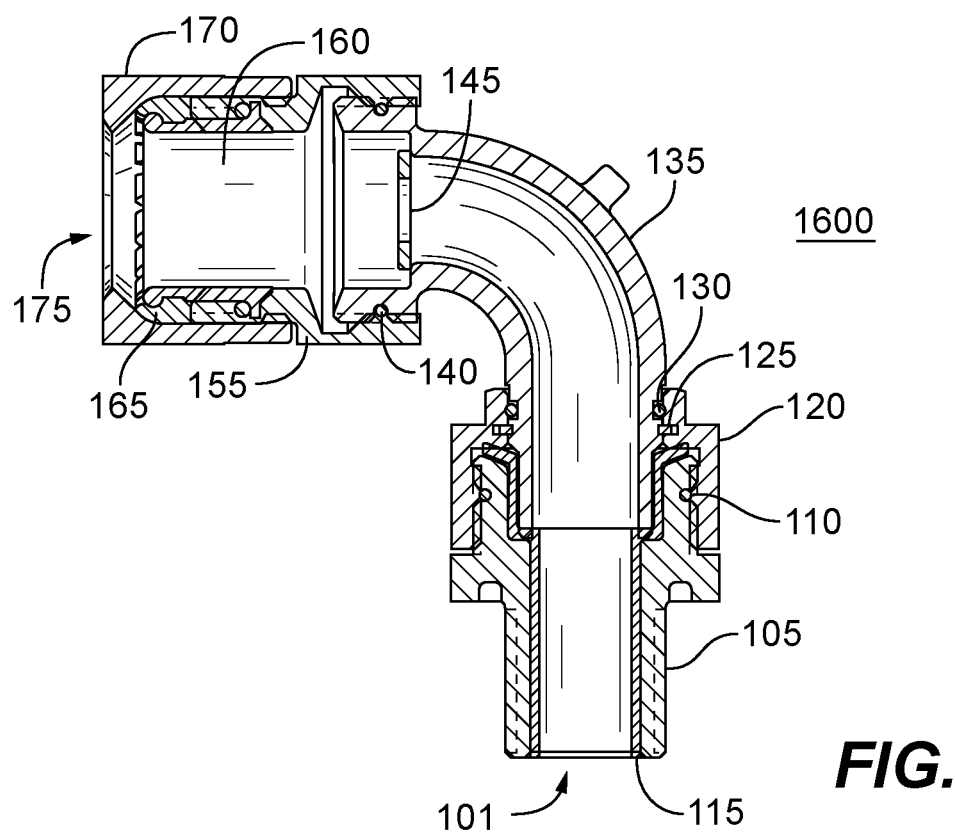
FIG. 17 is a cross-sectional side view of the cable gland of FIG. 16 according to the present disclosure.
Figure 18:
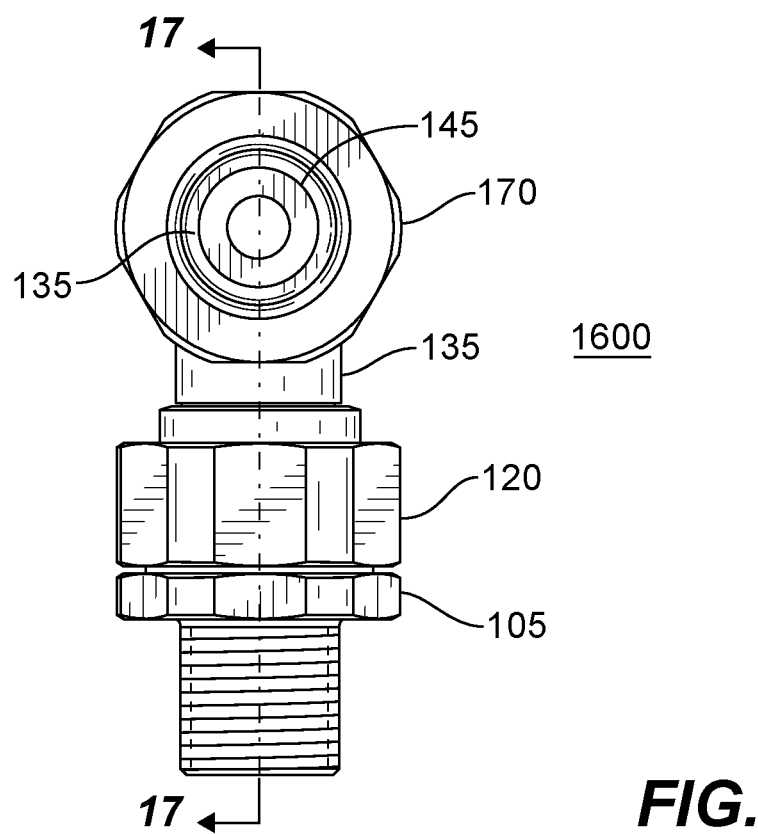
FIG. 18 is a front plan view of the cable gland of FIG. 16 according to the present disclosure.

Referring to FIG. 16, an exploded perspective view of an exemplary embodiment of an sealed, unarmored cable gland 1600 having a 90° bend angle according to the present disclosure is shown. Note that as described herein, components with identical reference numbers in different figures, such as those shown in FIGS. 1-3, are intended to describe the same component. For example, entry component 105 in FIG. 1 is also illustrated here in FIG. 16 as entry component 105. However, the inventory of components identified in FIGS. 1-3 are not identical to those illustrated here in FIG. 16. More specifically, the grounding spring 150 of FIG. 1 is not part of the embodiment illustrated in FIG. 16, thus cable gland 1600 is not a grounded cable gland. In some embodiments, unarmored cable glands are intended for use with cord, tray cable, and other types of unarmored cable. FIG. 17 is a cross-sectional side view of the cable gland 1600 of FIG. 16 according to the present disclosure is shown. FIG. 18 is a front plan view of the cable gland 1600 of FIG. 16 according to the present disclosure is shown. For reference, FIG. 17 is a cross-sectional side view taken along a plane of line 17-17 in FIG. 18.

Figure 19:
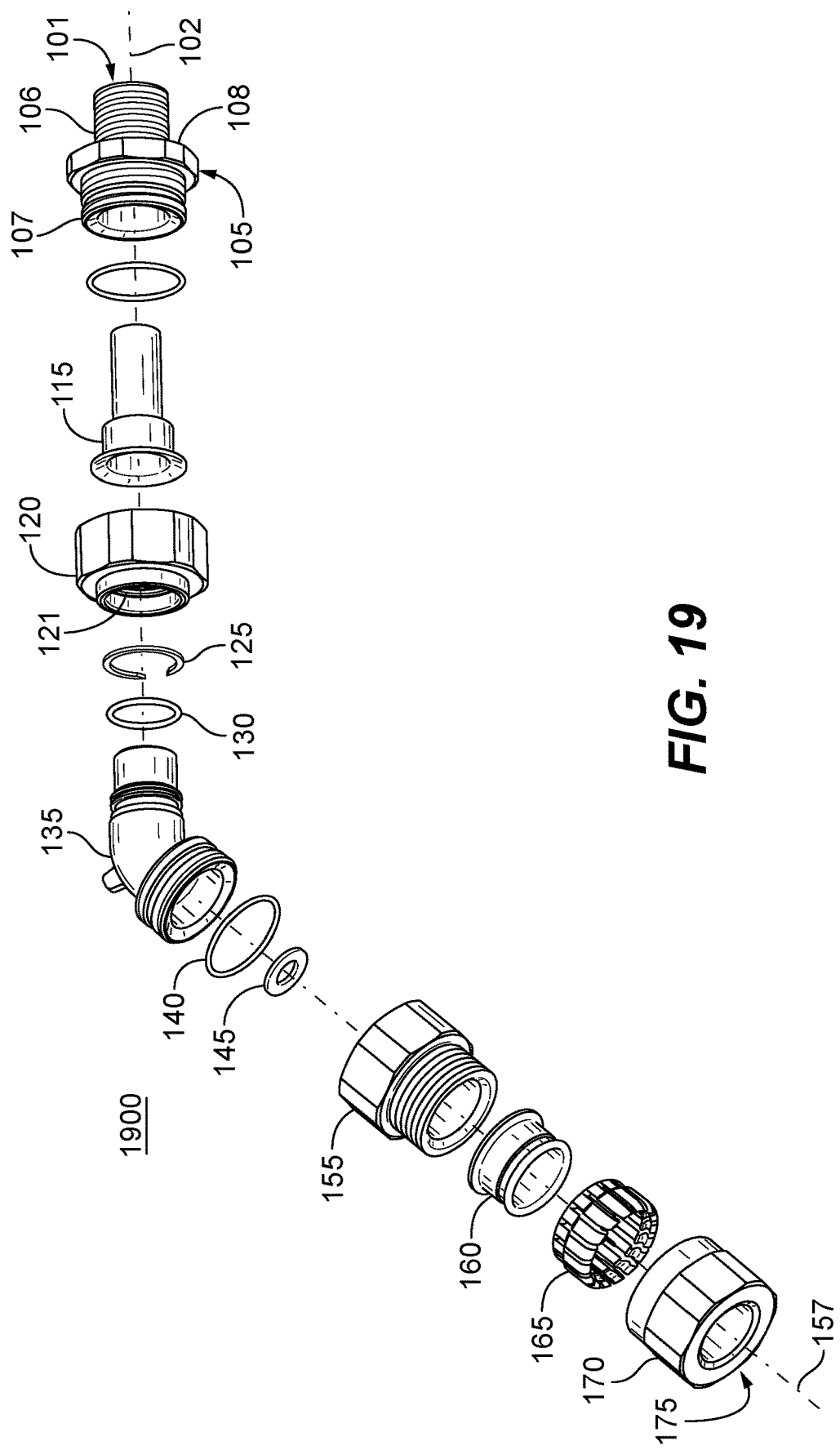
FIG. 19 is an exploded perspective view of an exemplary embodiment of a sealed, unarmored cable gland having a 45° bend angle according to the present disclosure.
Figure 20:
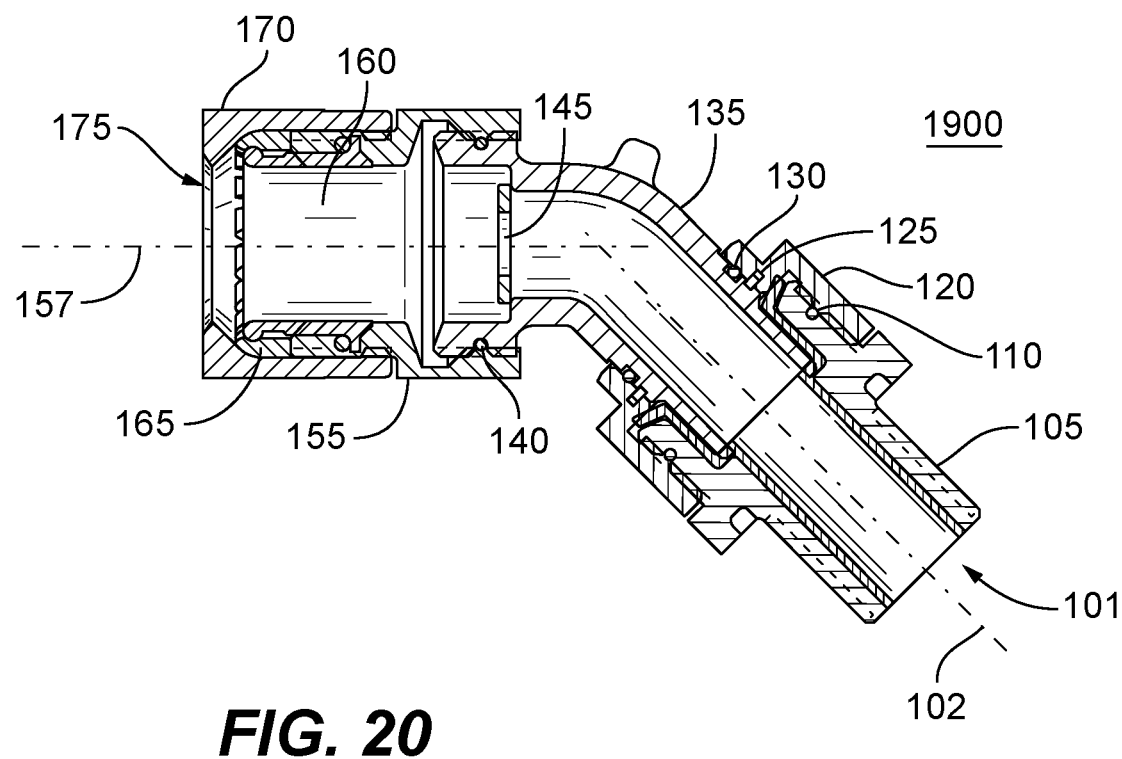
FIG. 20 is a cross-sectional side view of the cable gland of FIG. 19 according to the present disclosure.
Figure 21:
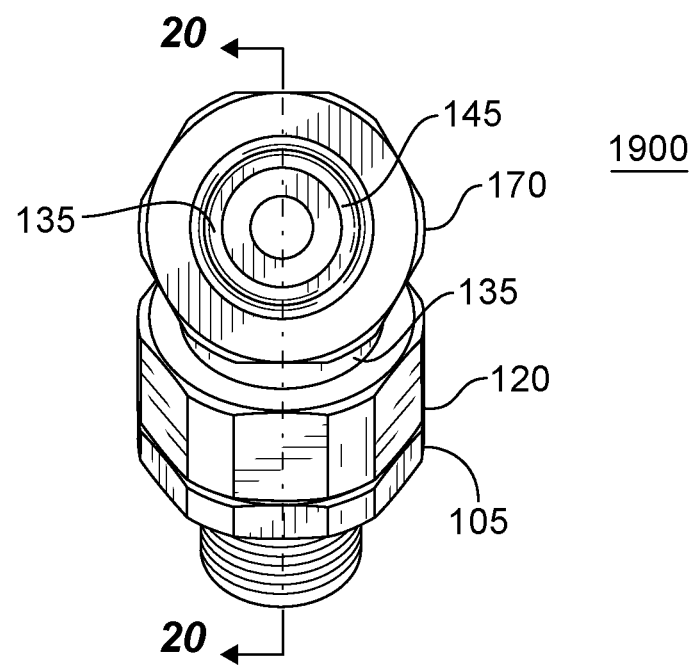
FIG. 21 is a front plan view of the cable gland of FIG. 19 according to the present disclosure.

Referring to FIG. 19, an exploded perspective view of an exemplary embodiment of an sealed, unarmored cable gland 1900 having a 45° bend angle according to the present disclosure is shown. Note that as described herein, components with identical reference numbers in different figures, such as those shown in FIGS. 4-6, are intended to describe the same component. For example, entry component 105 in FIG. 4 is also illustrated here in FIG. 19 as entry component 105. However, the inventory of components identified in FIGS. 4-6 are not identical to those illustrated here in FIG. 19. More specifically, the grounding spring 150 of FIG. 4 is not part of the embodiment illustrated in FIG. 19, thus cable gland 1900 is not a grounded cable, i.e., it is ungrounded. FIG. 20 is a cross-sectional side view of the cable gland 1900 of FIG. 19 according to the present disclosure is shown. FIG. 21 is a front plan view of the cable gland 1900 of FIG. 19 according to the present disclosure is shown. For reference, FIG. 20 is a cross-sectional side view taken along a plane of line 20-20 in FIG. 21.

Figure 22:
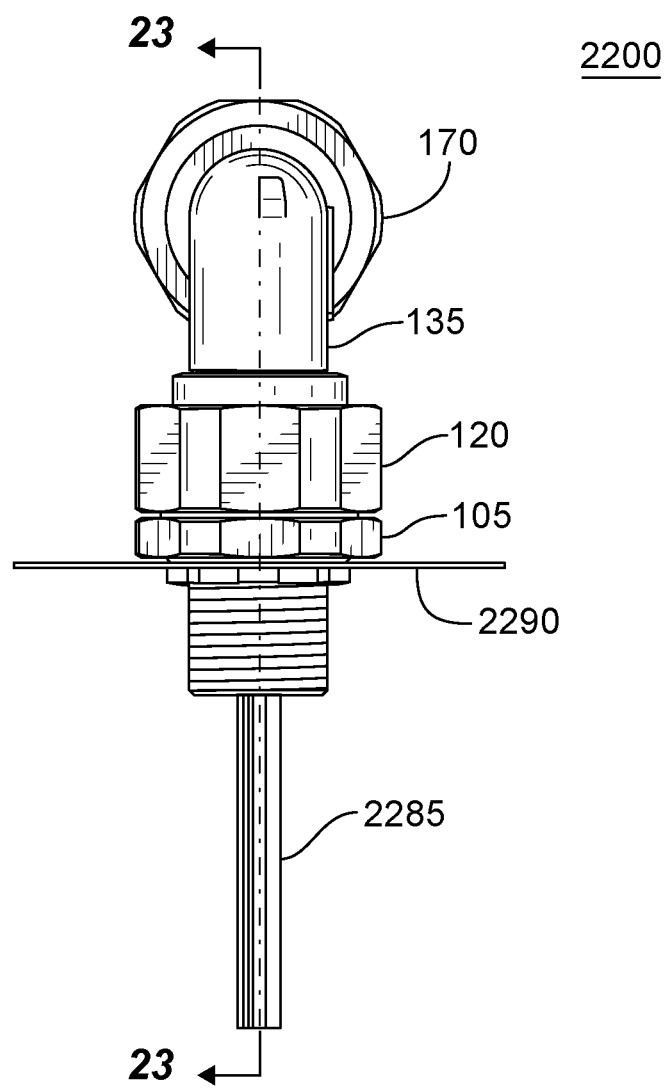
FIG. 22 is a back plan view of the cable gland of FIG. 1 installed in sheet metal according to the present disclosure.

Referring to FIG. 22, a back plan view of the cable gland 2200 of FIG. 1 according to the present disclosure is shown. The cable gland 2200 is installed in sheet metal 2290. In some embodiments, the sheet metal is a wall of an electrical junction box, such as the electrical junction box shown in FIG. 24. A cable 2285 is physically coupled within the cable gland 2200. In some embodiments, the cable 2285 is a multi-conductor electrical cable, that is electrically coupled to the cable gland 2200. The cable 2285 is electrically grounded through the grounding spring 150. In some embodiments, the potting chamber 115 contains a two-part epoxy and the cable 2285 to seal the cable 2285 against environmental hazards, including explosive environments, as described herein.

Figure 23:
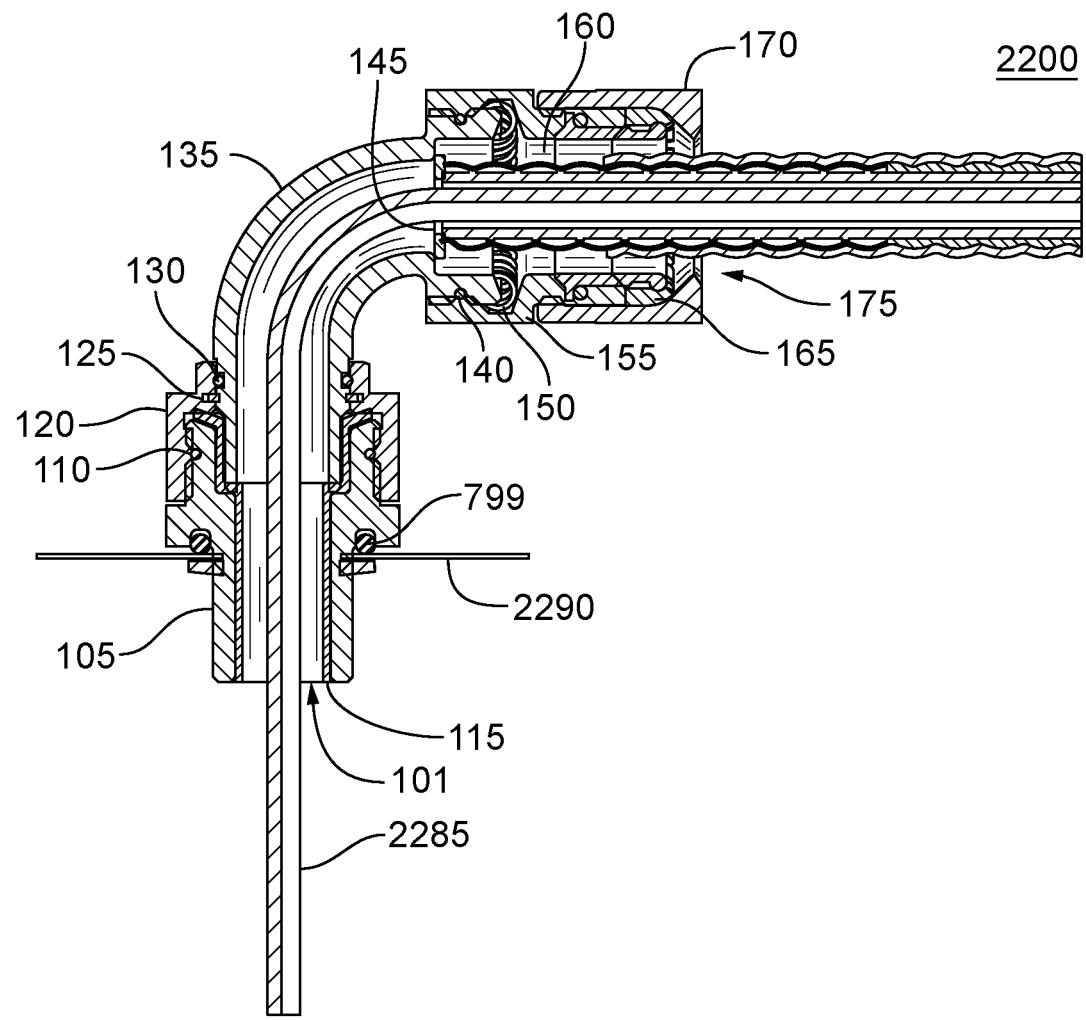
FIG. 23 is a cross-sectional side view of the cable gland of FIG. 1 according to the present disclosure.

Referring to FIG. 23, a sectional, cross-section side view of the cable gland of FIG. 22 according to the present disclosure is shown. For reference, FIG. 23 is a sectional, cross-section side view taken along a plane of line 23-23 in FIG. 22. The cable gland 2200 is installed in the in sheet metal 2290. In some embodiments, the separate O-ring 799 creates a seal between the entry component 105 and any surface, such as the sheet metal 2290, or enclosure, being physically coupled to. In some embodiments, the sheet metal 2290 is part of an electrical junction box, such as the electrical junction box shown in FIG. 24. The cable 2285 is physically coupled within the cable gland 2200. In some embodiments, the cable 2285 is a multi-conductor electrical cable, that is electrically coupled to the cable gland 2200. The cable 2285 is electrically grounded through the grounding spring 150. In some embodiments, the potting chamber 115 contains a two-part epoxy and the cable 2285 to seal the cable 2285 against environmental hazards, including explosive environments, as described herein.

Figure 24:
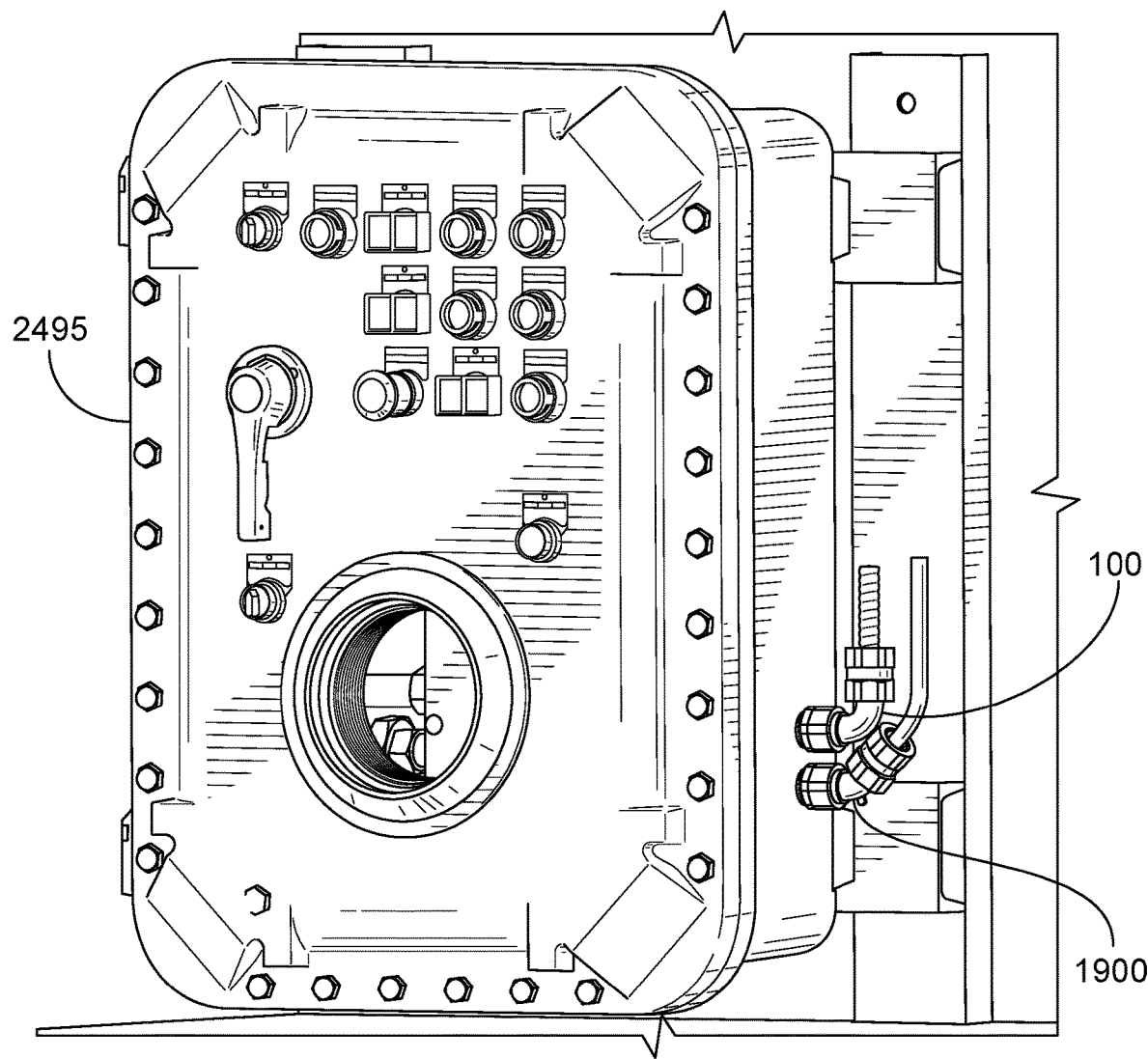
FIG. 24 is perspective view of the cable gland of FIG. 1 and the cable gland of FIG. 19 both physically coupled with an electrical junction box according to the present disclosure.

Referring to FIG. 24, a perspective view of the cable gland 100 of FIG. 1 and the cable gland 1900 of FIG. 19 both physically coupled with an electrical junction box 2495 according to the present disclosure. The cable gland 100 and the cable gland 1900 are both physically coupled and electrically coupled with the electrical junction box 2495 as shown in FIG. 24 2400. As illustrated in FIG. 24, the 90° bend in cable gland 100 and the 45° bend in cable gland 1900 enable a reduction in area needed for installation of cable glands. In some embodiments, cable glands having different bend angles, such as the 90° bend in cable gland 100 and the 45° bend in cable gland 1900 enable a further reduction in area needed for installation of cable glands by allowing more efficient packing, while providing strain relief, environmental protection, including explosive environment protection. In some embodiments, these cable glands 100, 1900 provide strain relief, electrical grounding and/or environmental protection, including explosive environment protection. In some embodiments, environmental protection provided by one or more cable glands disclosed herein have features, in conformance with, or exceeding, various standards such as applicable National Electrical Code (NEC) standards.

Some embodiments herein describe a cable gland including an entry portion, the entry portion including an entry component, an elbow portion physically coupled to the entry portion, the elbow portion including a locking collar, a snap ring and a union elbow, and an exit portion physically coupled to the elbow portion, the exit portion including a middle nut, a rubber seal, a seal clamp and a back nut.

Some other embodiments herein describe a cable gland an entry portion, the entry portion including an entry component, a potting chamber and a first O-ring physically coupled between the entry component and the potting chamber, an elbow portion physically coupled to the entry portion, the elbow portion including a locking collar, a union elbow, a second O-ring physically coupled between locking collar and the union elbow and a snap ring physically coupled between locking collar and the union elbow, and an exit portion physically coupled to the elbow portion, the exit portion including a middle nut, a third O-ring physically coupled between the union elbow and the middle nut, an armor stop physically coupled between the union elbow and the middle nut, a back nut and a rubber seal and a seal clamp physically coupled between the middle nut and the back nut.

Some still other embodiments herein describe a cable gland including an entry portion, the entry portion including an entry component, an elbow portion physically coupled to the entry portion, the elbow portion including a locking collar, a union elbow, a second O-ring physically coupled between locking collar and the union elbow and a snap ring physically coupled between locking collar and the union elbow, and an exit portion physically coupled to the elbow portion, the exit portion including a middle nut, a third O-ring physically coupled between the union elbow and the middle nut, an armor stop physically coupled between the union elbow and the middle nut, a back nut and a rubber seal and a seal clamp physically coupled between the middle nut and the back nut.

It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A protective device for electrically conductive elements, comprising:
   an entry portion, the entry portion including an entry component;
   an elbow portion physically coupled to the entry portion, the elbow portion including a locking collar and a union elbow, the elbow portion physically coupled to the entry portion via the locking collar, and the union elbow and the locking collar rotatably coupled and retained axially to one another; and
   an exit portion physically coupled to the elbow portion.

2. The protective device according to claim 1, wherein the entry portion further comprises a potting chamber.

3. The protective device according to claim 2, wherein the entry portion further comprises a first O-ring physically coupled between the entry component and the potting chamber.

4. The protective device according to claim 3, wherein the elbow portion further comprises a second O-ring physically coupled between locking collar and the union elbow.

5. The protective device according to claim 1, wherein the exit portion includes a middle nut, and wherein the elbow portion further comprises an O-ring physically coupled between the union elbow and the middle nut.

6. The protective device according to claim 1, further comprising an armor stop.

7. The protective device according to claim 6, wherein armor stop includes a center aperture and the armor stop is physically coupled to the union elbow.

8. The protective device according to claim 1, wherein the exit portion includes a middle nut, a back nut, and a grounding spring, the ground spring physically coupled to the union elbow and the middle nut.

9. The protective device according to claim 1, wherein the exit portion includes a middle nut, and wherein the union elbow is formed of cast metal machined to have male threads to physically couple to corresponding female threads in the middle nut.

10. The protective device according to claim 1, wherein the union elbow has a 90° bend.

11. The protective device according to claim 1, wherein the union elbow has a 45° bend.

12. The protective device according to claim 1, wherein the elbow portion comprises a snap ring between the locking collar and the union elbow.

13. The protective device according to claim 12, wherein the snap ring is positioned at least partially within a first groove in the locking collar and at least partially within a second groove in the union elbow.

14. A cable gland, comprising:
   an entry portion, the entry portion including an entry component, a potting chamber and a first O-ring physically coupled between the entry component and the potting chamber;
   an elbow portion physically coupled to the entry portion, the elbow portion including a locking collar, a union elbow, a second O-ring physically coupled between locking collar and the union elbow and a snap ring rotatably coupling and axially retaining the locking collar to the union elbow; and
   an exit portion physically coupled to the elbow portion, the exit portion including a middle nut, a third O-ring physically coupled between the union elbow and the middle nut, a back nut and a rubber seal and a seal clamp physically coupled between the middle nut and the back nut.

15. The cable gland according to claim 14, wherein the exit portion further comprises an armor stop.

16. The cable gland according to claim 15, wherein the exit portion is physically coupled to a National Pipe Thread Taper (NPT)-compatible housing.

17. A protective device for electrically conductive elements, comprising:
   an entry portion, the entry portion including an entry component;
   an elbow portion physically coupled to the entry portion, the elbow portion including a locking collar, a union elbow, and a first O-ring physically coupled between locking collar and the union elbow, the union elbow and the locking collar rotatably coupled and retained axially to one another; and
   an exit portion physically coupled to the elbow portion, the exit portion including a middle nut, a second O-ring physically coupled between the union elbow and the middle nut, and a back nut.

18. The protective device according to claim 17, wherein the entry portion further comprises a potting chamber.

19. The protective device according to claim 17, wherein the exit portion further comprises a grounding spring physically coupled between the union elbow and the middle nut.

20. The protective device according to claim 17, wherein the elbow portion comprises a snap ring between the locking collar and the union elbow.

21. The protective device according to claim 20, wherein the snap ring is positioned at least partially within a first groove in the locking collar and at least partially within a second groove in the union elbow.

22. The cable gland according to claim 21, wherein the union elbow has a bend angle of at least 30° and less than or equal to 90°.

* * * * *